United States Patent [19]
Kaya et al.

[11] Patent Number: 5,943,247
[45] Date of Patent: Aug. 24, 1999

[54] ELECTRONIC DESK CALCULATOR WITH COUNTER AND COUNTER DISPLAY

[75] Inventors: Shuji Kaya; Eiji Maruo, both of Nara; Miho Ohba, Yamatokoriyama, all of Japan

[73] Assignee: Sharp Kabushiki Kaisha, Osaka, Japan

[21] Appl. No.: 08/811,782

[22] Filed: Mar. 6, 1997

[30] Foreign Application Priority Data

Mar. 7, 1996 [JP] Japan ..................................... 8-050656

[51] Int. Cl.⁶ ..................................................... G06F 3/00
[52] U.S. Cl. ................... 364/709.12; 364/705; 364/710; 364/709; 364/715
[58] Field of Search ............................. 364/709, 709.07, 364/709.01, 710, 710.08, 705, 709.12, 715

[56] References Cited

U.S. PATENT DOCUMENTS

| | | | |
|---|---|---|---|
| 4,217,656 | 8/1980 | Hirano et al. ............................. | 364/710 |
| 4,306,294 | 12/1981 | Hashimoto et al. ..................... | 364/705 |
| 4,347,579 | 8/1982 | Matsuyama .............................. | 364/709 |
| 4,761,750 | 8/1988 | Yoshino et al. .......................... | 364/709 |
| 4,811,257 | 3/1989 | Sumitani ............................. | 364/709.01 |
| 5,050,115 | 9/1991 | Matsuda et al. .................... | 364/709.07 |
| 5,079,732 | 1/1992 | Koumo et al. ...................... | 364/709.12 |
| 5,150,316 | 9/1992 | Morita et al. ....................... | 364/709.12 |
| 5,381,353 | 1/1995 | Oba .................................... | 364/710.08 |

FOREIGN PATENT DOCUMENTS

| | | |
|---|---|---|
| 50-11496 | 2/1975 | Japan . |
| 57-136270 | 8/1982 | Japan . |
| 57-150056 | 9/1982 | Japan . |
| 2-15359 | 1/1990 | Japan . |

*Primary Examiner*—Hassan Kizou
*Assistant Examiner*—Rijue Mai
*Attorney, Agent, or Firm*—Nixon & Vanderhye P.C.

[57] ABSTRACT

An electronic desk calculator includes: an input device for inputting a plurality of numeral units and an operator; a counter for storing a value representing the number of numeral units; a controller for performing a calculation based on at least one numeral unit and the operator, and for receiving the at least one numeral unit input through the input device to increase a value stored in the counter by one; and a display for displaying the value stored in the counter.

12 Claims, 33 Drawing Sheets

FIG. 15

| | Display screen | Display counter | Memory counter |
|---|---|---|---|
| S61 | 00　　　　0. | 0 | 0 |
| | ↓ 2 | | |
| S62 | 01　　　　2. | 1 | 0 |
| | ↓ [×] | | |
| S63 | 01　　　　2. | 1 | 0 |
| | ↓ 3 | | |
| S64 | 02　　　　3. | 2 | 0 |
| | ↓ [M+] | | |
| S65 | 02　　　　6.M | 2 | 2 |
| | ↓ [RM] | | |
| S66 | 02　　　　6.M | 2 | 2 |
| | ↓ [×] | | |
| S67 | 02　　　　6.M | 2 | 2 |
| | ↓ 3 | | |
| S68 | 03　　　　3.M | 3 | 2 |
| | ↓ [=] | | |
| S69 | 03　　　18.M | 3 | 2 |
| | ↓ [RM] | | |
| S70 | 02　　　　6.M | 2 | 2 |
| | ↓ 2 | | |
| S71 | 01　　　　2.M | 1 | 2 |

↓ 35 [÷] [PRE] [=]

S207 | 02　　　　5.

↓ "GT", 2 [x] 3 [=]

S208 | 02　　　6. G

↓ [G] [GT]

S209 | 01　　　6. G

↓ "V", 5 [x] 789 [=]

S210 | 02　　3,945.

↓ 5 [x] 89 [=]

S211 | 02　　　445.

↓ [PRE]

S212 | 02　　3,945.

↓ [PRE]

S213 | 02　　　445.

↓ 5 [x] 89 [=]

S214 | 02　　445. V

↓ "·", 123 [x] 4 [x] 5 [=]

S215 | 03　　2,460.

↓ [PRE]

S216 | 03　　2,460.

↓ "V", 123 [x] 4 [x] 5 [=]

S217 | 03　　2,460. V

↓ 123 [x] 20 [=]

S218 | 02　　2,460.

ELECTRONIC DESK CALCULATOR WITH COUNTER AND COUNTER DISPLAY

BACKGROUND OF THE INVENTION

1. Field of the Invention

The present invention relates to an electronic desk calculator having a counter function, a verification function or a state display function.

2. Description of the Related Art

Japanese Laid-Open Patent Publication Nos. 50-11496 and 57-136270 disclose a calculator having a counter function. The counter provided in a conventional calculator counts how many time an operator key(s) is depressed to count the number of numeral units. Moreover, when a key for clearing the result of a calculation is depressed, the value stored in the counter is also disadvantageously cleared.

By inputting elements, the calculator performs a calculation based on input elements. The elements are classified into at least a numeral unit and an operator. For example, in the case where an expression "1000+500=" is to be calculated, "1000" and "500" are numeral units, and "+" and "=" are operators.

The counters disclosed in Japanese Laid-Open Patent Publication Nos. 50-11496 and 57-136270 assume counting in a calculator basically performing addition. However, the above Patent Publications show neither a counting operation in a calculator performing a calculation in accordance with a formula nor a counting operation for a specific operator key.

In a conventional technique, since a counting operation is performed at the time when the operator key is depressed, a value on the counter shows the number of operators, but not the number of numeral units. Therefore, if a user forgets the position of an input element, a method for seeking the position of the input element in the case where the numeral unit is input differs from that in the case where the operator is input. In the case where the numeral unit is input, the numeral unit obtained by adding one to the value of the counter should be searched for from elements including the numeral unit. Immediately after entering the operator, the numeral unit identical with the value of the counter should be searched for from the element.

Furthermore, In a conventional technique, in the case where the result of a calculation is cleared by a clear key, the value of the counter is also cleared. If another calculation is executed after execution of one calculation in a calculator in accordance with an expression, there arises a problem that the value of the counter is not cleared regardless of the operation of the clear key.

In a conventional technique, the number of depressions of the operator key is counted. Therefore, after depressing a wrong key, when a correct operator key is depressed in accordance with an expression so as to perform a correction, the number of actually performed calculations and the number of depressions of the operator key are different from each other. Thus, the counter does not indicate a correct value.

According to a conventional technique, in the case where a user repeatedly inputs the same operator and the same numeral unit, the repeated input of the same operator and the same numeral unit can be omitted by depressing a particular key, for example, "=". Thus, the number of calculations actually performed and the number indicated by the counter are not identical with each other.

In the case where two or more calculations are allocated to a key displaying the plurality of results of loop calculations in turn, for example, a tax key, the number of calculations and the number indicated by the counter are not identical with each other because the number of actual depressions of the key is counted.

In a conventional technique, a counter for memory counts the number of depression of a [M+] key or a [M−] key. However, even in the case where an expression (including an operator and a numeral unit) is input so au to simultaneously execute the expression by using the [M+] key and the addition of the result thereof to the memory, the value of the counter is increased by only one. Therefore, the number of actual calculations and the number counted by the counter arm not disadvantageously not identical with each other.

In a conventional technique, the number of counts is increased by only one even for a value recalled from a memory or the like. In the case where a complicated expression is calculated by using a memory, only one recalled value is counted even if a plurality of additions and subtractions are performed for the memory. Therefore, the number of actual calculations and the number indicated by the counter are not identical with each other.

Japanese Laid-Open Patent Publication Nos. 57-150056 and 02-15359 disclose a calculator for comparing a plurality of displayed values. Therefore, there is a problem in that a user should compare the result of a calculation with a comparison value.

Since there is no state display showing that the calculation state is now in the course of input of a numeral unit or after the input of an operator, the user forgets the element being input. Therefore, If the user seeks for the element being input based on the value of the counter, the user cannot see with which part the input should be started.

SUMMARY OF THE INVENTION

The electronic desk calculator of the present invention includes: an input device for inputting a plurality of numeral units and an operator; a counter for storing a value representing the number of numeral units; a controller for performing a calculation based on at least one numeral unit and the operator, and for receiving the at least one numeral unit input through the input device to increase a value stored in the counter by one; and a display for displaying the value stored in the counter.

According to another aspect of the invention, an electronic desk calculator includes: an input device for inputting a first numeral unit, an operator, a second numeral unit, and an instruction for obtaining a result of a calculation; a display counter for storing the value representing the number of the first and second numeral units; an internal counter; a first register for storing the first numeral unit and the second numeral unit in the case where the one of the first numeral unit and the second numeral unit is input and for storing a result of a calculation when the instruction is input; a second register for storing the value stored in the first register in response to a signal corresponding to the input operator; a controller for calculating the value stored in the first register and the value stored in the second register based on the operator; and a display for displaying the value stored in the display counter and the value stored in the first register. In this context, when a third numeral unit is input from the input device after the value stored in the display counter in stored in the internal counter in response to the instruction, the controller stores 1 in the display counter. The controller stores the value stored in the internal counter in the display counter, when the instruction is input from the input device after the third numeral unit is input from the input device.

According to still another aspect of the invention, an electronic desk calculator includes: an input device for inputting a plurality of numeral units and an instruction for obtaining two or more results of calculations; a display counter; a controller for calculating the two or more results of the calculations based on at least one of the numeral units and the instruction for obtaining the two or more results of the calculations; and a display for displaying one of the two or more results of the calculations and a predetermined count number.

According to still another aspect of the invention, an electronic desk calculator includes: an input device for inputting a plurality of numeral units and an instruction for obtaining two or more results of calculations; a display counter; a controller for calculating the two or more results of the calculations based on at least one of the numeral units and the instruction; and a display for successively displaying one of the two or more results of the calculations. In this context, when the instruction is input from the input device, the display displays a value stored in the display counter and one of the two or more results of the calculations.

According to still another aspect of the invention, an electronic desk calculator includes: a comparator for comparing a result of a calculation with a result of a previous calculation upon execution of the calculation; and a display device for displaying the result of the comparison.

Thus, the invention described herein makes possible the advantage of providing an electronic desk calculator allowing a user to see a current position in a calculation based on a displayed count in the event that the user forgets the position in the course of the calculation. The invention is also capable of automatically comparing a subject to be compared with the result of a calculation to display whether an operator has been input or not.

These and other advantages of the present invention will become apparent to those skilled in the art upon reading and understanding the following detailed description with reference to the accompanying figures.

BRIEF DESCRIPTION OF THE DRAWINGS

FIG. 15 is an exemplary display screen in Example 5 according to the present invention.

FIG. 19 is a view showing an exemplary display screen of an electronic desk calculator according to the present invention.

FIG. 30 is a view showing an exemplary display screen of the electronic desk calculator in Example 7 according to the present invention.

DESCRIPTION OF THE PREFERRED EMBODIMENTS

EXAMPLE 1

Figure 1:
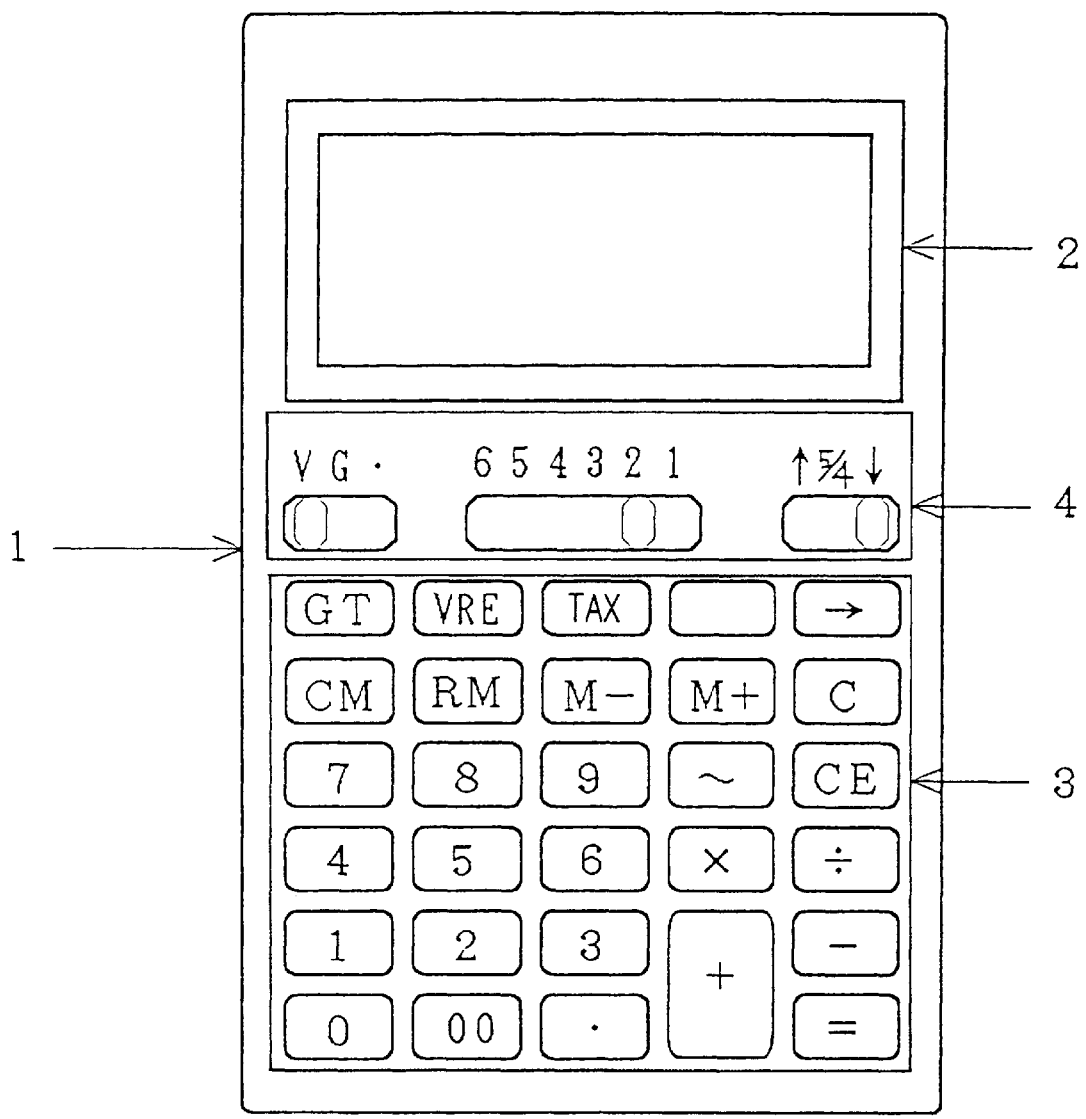
FIG. 1 is a view showing the appearance of an electronic desk calculator according to the present invention.
Figure 2:
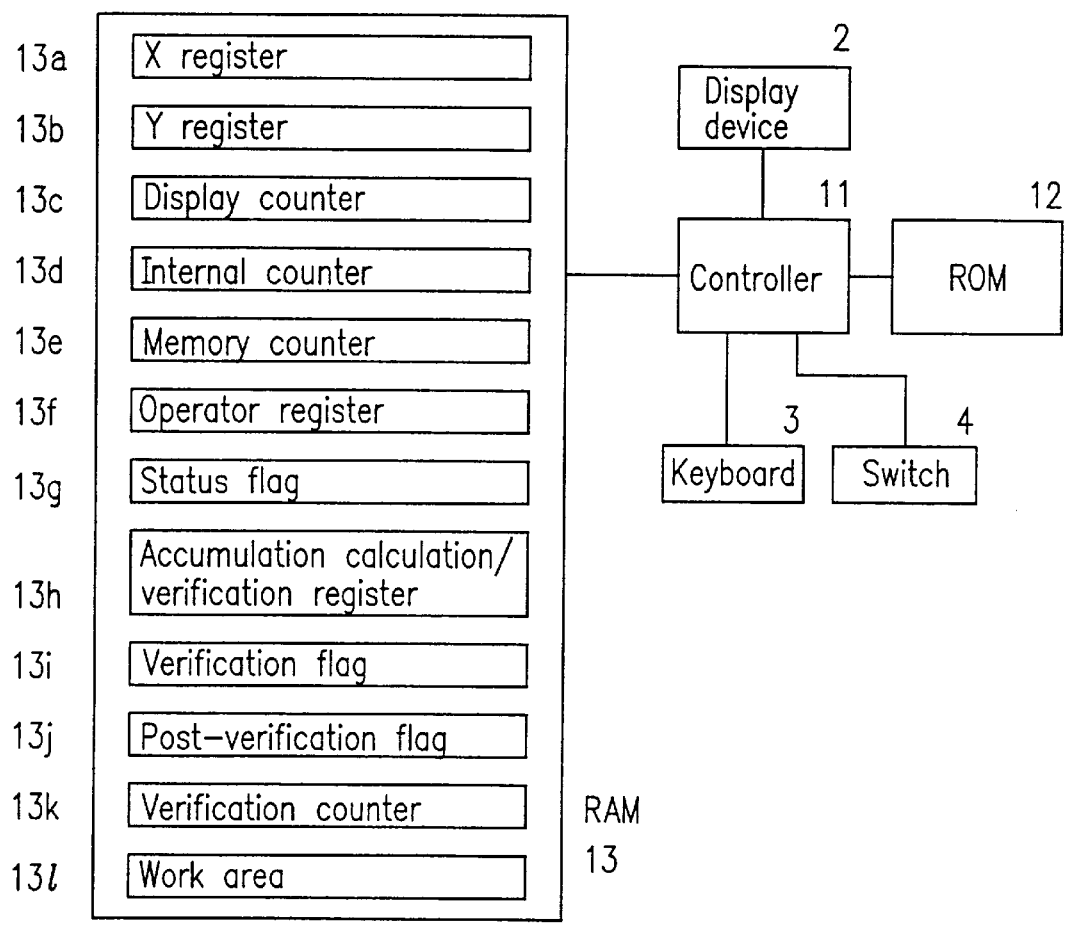
FIG. 2 is a block diagram showing an example of an electronic desk calculator according to the present invention.

FIG. 1 shows an example of the appearance of an electronic desk calculator according to the present invention. The electronic desk calculator of Example 1 includes a display device 2, and a keyboard 3. As shown in FIG. 2, the electronic desk calculator of the present invention also includes a controller 11, a ROM 12 and a RAM 13.

The display device 2 displays a numeral unit, the result of a calculation, and a value of a counter. The display device 2 may be a liquid crystal display device.

The keyboard 3 includes numerical keys for inputting a numeral unit, a decimal point key, operator keys, and calculation result keys such as a [=] key.

FIG. 2 shows an example of the configuration of the electronic desk calculator shown in FIG. 1.

When a particular key on the keyboard 3 is depressed, a signal corresponding to the particular key is output to the controller 11.

The controller 11 receives the signal from the keyboard 3 so as to determine which key on the keyboard 3 is pressed. The controller 11 performs a computing process including arithmetical operations, a counting process for the display counter 13c, and a display process of the result of the calculation.

The ROM 12 stores programs such as a program for performing the processes described above and a program for generating computer graphics.

The RAM 13 includes an operator register 13f and a display counter 13c.

Figure 3:
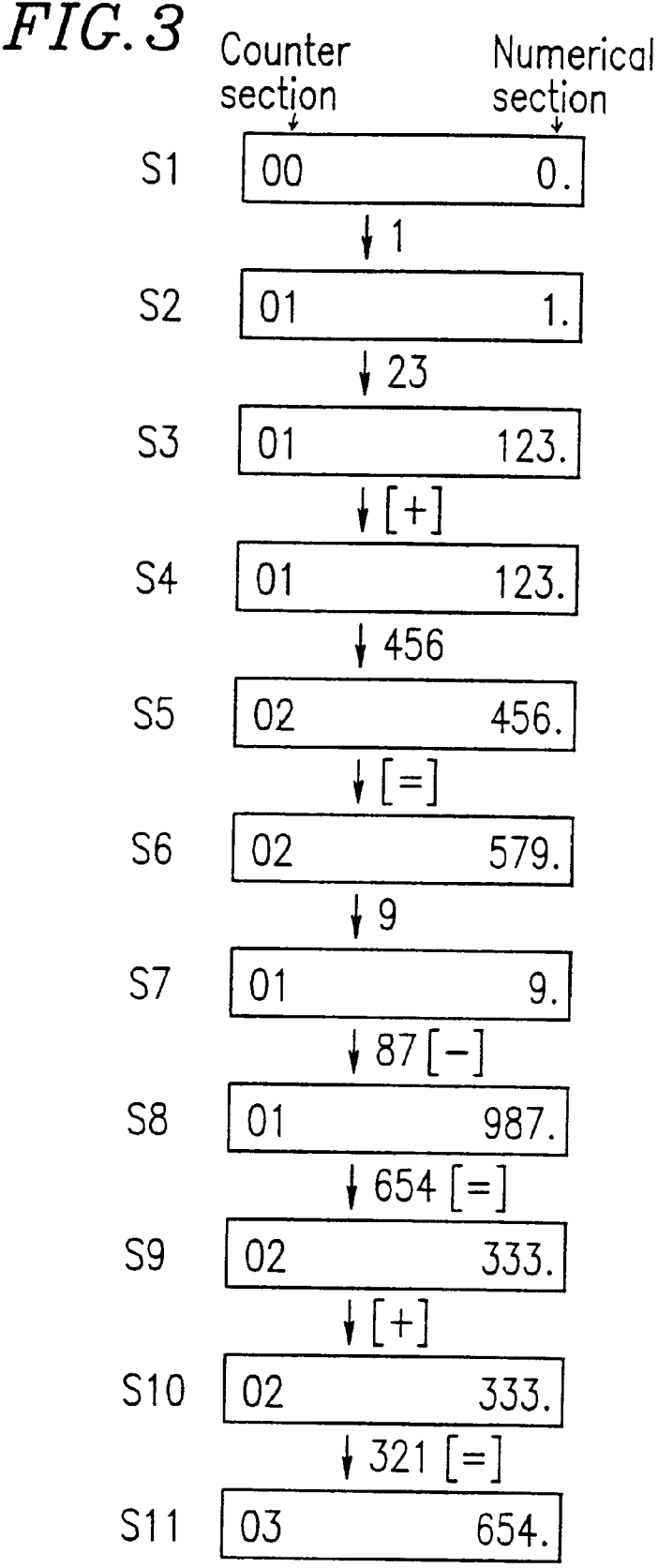
FIG. 3 is an exemrplary display screen in Example 1 according to the present invention.

An example of the operation of an electronic desk calculator of the present invention will be described with reference to FIG. 3. FIG. 3 shows the relationship between the transition of a display screen of the display device 2 and the data input through the keyboard 3.

A display screen S1 shows an initial screen of the display device 2. Herein, the initial screen signifies a screen displaying 00 in a counter section and 0 in a numerical section. In the case where a power switch in turned ON or a clear key [C] is depressed, the display device 2 displays an initial state screen.

A display screen S2 shows the screen in the case where a head portion 1 of a numeral unit 123 is input. When the head portion 1 of the numeral unit is input, a counter value 01 is displayed on the counter section, and a numerical value 1 is displayed on the numerical section. A display screen S3 shows the screen in the case where input of the numeral unit 123 is completed. While the numerical value 123 is displayed on the numerical section, the value displayed on the numerical section remains unchanged.

A display screen S4 shows the screen in the case where [+] is input as an operator. The values respectively displayed on the numerical section and the counter section are not changed thereby. A display screen S5 shows a screen in the case where the numeral unit 456 has been input as an operand. As a result, the counter value 02 is displayed on the counter section and the numerical value 456 is displayed on the numerical section.

A display screen S6 shows the screen in the case where the input of a calculation result key [=] is completed so as to obtain the result of the calculation. The numerical value 579 representing the result of the calculation is displayed on the numerical section, while the value displayed on the counter section remains unchanged.

Subsequent to the above operation, a display screen S7 shows a screen in the case where a head portion 9 of a numeral unit 987 has been input. As a result, the counter value 01 is displayed on the counter section, and the numerical value 9 is displayed on the numerical section. A display screen S8 shows the case where the input of the numeral unit 987 is completed followed by the input of an operator [−].

A display screen S6 shows a screen in the case where the input of the numeral unit 654 is completed followed by input of an operator [=]. The counter value 02 is displayed on the counter section, and the result of the calculation, i.e., 333 is displayed on the numerical section. Although the numerical value 333 is displayed on the numerical section, the counter value 02 is still displayed on the counter section.

A display screen S10 shows a screen after a key [+] is depressed while the numerical value 333 is still displayed on the numerical section. Even by inputting the operator [+], the values displayed on the numerical section and the counter section remain unchanged.

A display screen S11 shows a screen after the input of a numeral unit 321 is completed followed by input of an operator [=]. The counter value 03 is displayed on the counter section, while the numerical value representing the result of the calculation, 654 is displayed on the numerical section.

Figure 4:
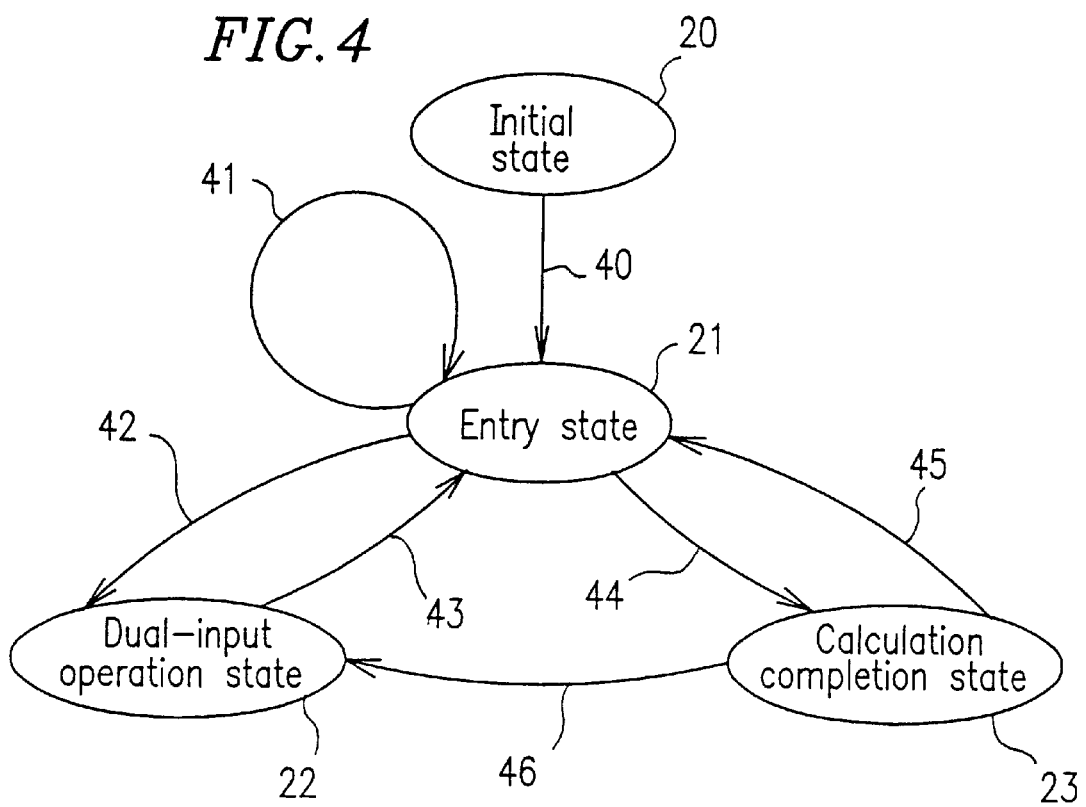
FIG. 4 is an exemplary state transition view in Example 1 according to the present invention.

Next, the operation of the electronic desk calculator according to the present invention will be described with reference to FIG. 4 in the case where the display device 2 of the electronic desk calculator displays the display screens S1 to S11. FIG. 4 shows an example of a state transition of an electronic desk calculator according to the present invention.

The user turns a power switch ON or depresses a clear key [C], whereby the electronic desk calculator of the present invention is set at an initial state.

When any one of the numerical keys is depressed, a signal corresponding to the depressed numerical key is generated. The controller 11 receives the signal generated by the numerical key. In response to the generated signal, the initial state transits to an entry state 21 via a path 40. As a result, the controller 11 increases the value stored in a display counter 13c by one. Specifically, the controller 11 recalls the value stored in the display counter 13c and then increases the value stored in the display counter 13c. Thereafter, the increased value is stored in the display counter 13c again. In response to such a transition, the controller 11 outputs the signal generated by the numerical key to the display device 2. A numeric character corresponding to the depressed numerical key is displayed on the numerical section of the display device 2 based on the signal generated by the numerical key. The value stored in the display counter 13c is displayed on the counter section of the display device 2.

Upon depression of the numerical key, the controller 11 receives the signal generated by the numerical key as described above. In response to the generated signal, the entry state 21 transits to the entry state 21 via a path 41. As a result, the controller 11 outputs the signal generated by the numerical key to the display device 2. A numerical character corresponding to the depressed numerical key is displayed on the numerical section of the display device 2 based on the generated signal. Since the display counter 13c maintains the value stored therein, the value displayed on the counter section of the display device 2 does not change.

When a dual-input operator key, for example, "+", "−", "×", "÷" or the like, is depressed, a signal corresponding to the dual-input operator key in generated. The controller 11 receives the signal generated by the dual-input operator key. In response to the generated signal, the entry state 21 transits to a dual-input operation state 22 via a path 42. The value displayed on the display device 2 in the dual-input operation state 22 is the same as that displayed on the display device 2 in the entry state 21. The display counter 13c maintains the value stored therein.

When the numerical key is depressed, the controller 11 receives the signal generated by the numerical key as described above. In response to the generated signal, the dual-input operation state 22 transits to the entry state 21 via a path 43. As a result, the controller 11 increases the value stored in the display counter 13c by one, and outputs the signal generated by the numerical key to the display device 2. A numerical character corresponding to the numerical key on the numerical section is displayed on the display device 2 based on the signal generated by the numerical key. The value stored in the display counter 13c is displayed on the counter section of the display device 2.

Upon depression of a calculation result key [=], a signal corresponding to the calculation result key is generated. The controller 11 receives the signal generated by the calculation result key [=]. In response to the generated signal, the entry state 21 transits to a calculation completion state 23 via a path 44. As a result, the numeral unit input before the dual-input operator key is depressed and the numeral unit input after the dual-input operator key is depressed is calculated based on the depressed dual-input operator key. The result of the calculation is displayed on the numerical section of the display device 2. The display counter 13c maintains the value stored therein. The value stored in the display counter 13c, i.e., 01 is displayed on the counter section of the display device 2.

When the numerical key is depressed, the controller 11 receives the signal generated by the numerical key as described above. In response to the generated signal, the calculation completion state 23 transits to the entry state 21 via a path 45. As a result, the controller 11 clears the display counter 13c, and increases the value stored in the display counter 13c by one. Then, the controller 11 outputs the signal generated by the numerical key to the display device 2. The display device 2 displays a numerical character corresponding to the numerical key on the numerical section based on the signal generated by the numerical key. The value stored in the display counter 13c is displayed on the counter section of the display device 2.

Upon depression of the dual-input operator key, a signal corresponding to the depressed dual-input operator key is generated. The controller 11 receives the signal generated by the dual-input operator key. In response to the generated signal, the calculation completion state 23 transits to the dual-input operation state 22 via a path 46. As a result of this, the display counter 13c maintains the value stored therein. The value displayed on the display device 2 in the dual-input operation state 22 is the same as that displayed in the display device 2 in the calculation completion state 23. Thereafter, the dual-input operation state 22 transits to another state. Since the subsequent transition is the same as that of the state transition described above, the description thereof is basically herein omitted.

Figure 5:
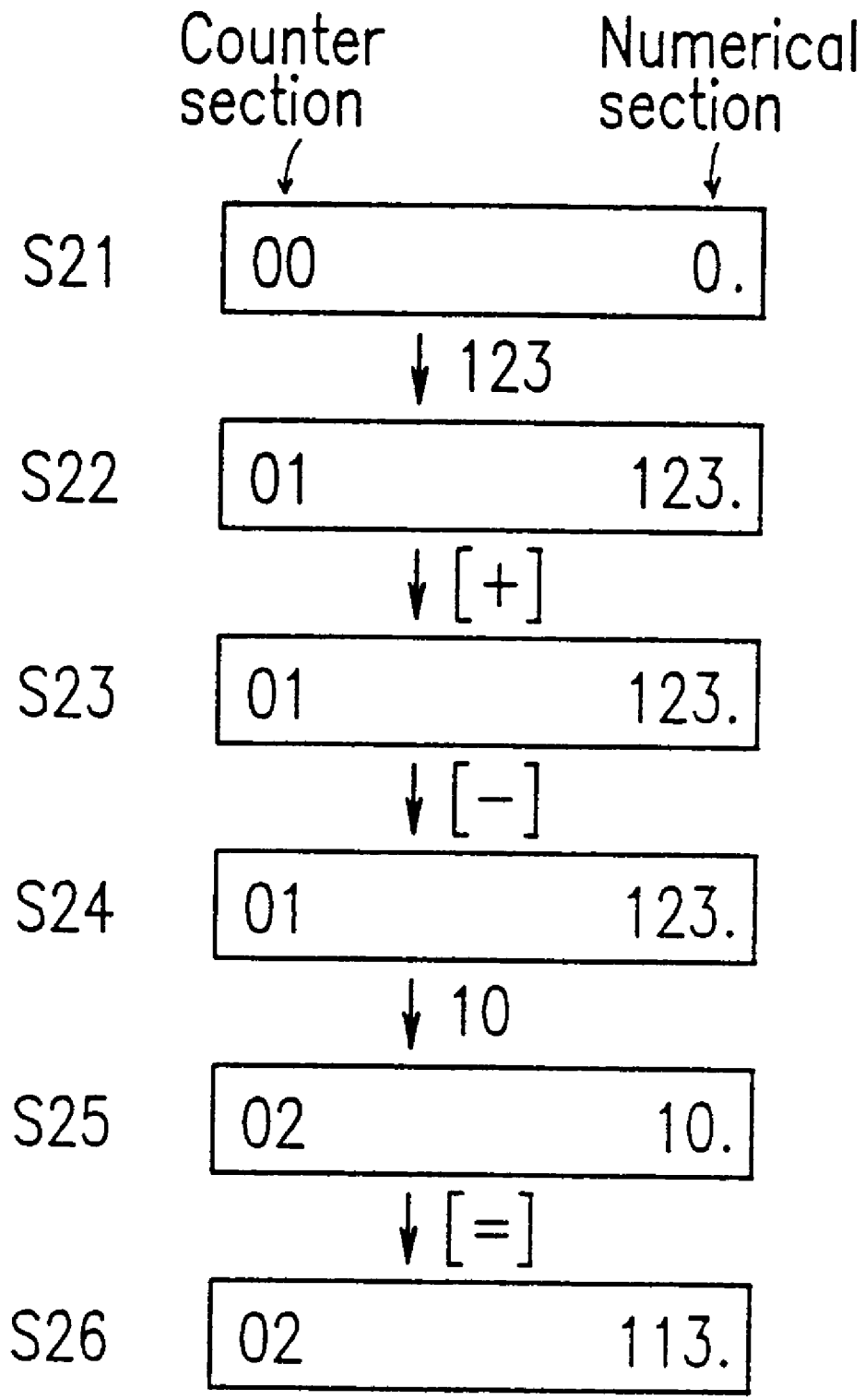
FIG. 5 is an exemplary display screen in Example 1 according to the present invention.

Next, an exemplary transition of a display screen of the electronic desk calculator according to the present invention in the case where the dual-input operator key is depressed in an arbitrary dual-input operation state 22 will be described with reference to FIG. 5. FIG. 5 shows a state transition of the display screen of the electronic desk calculator according to the present invention.

A display screen S21 shows an initial screen of the display device 2. A display screen S22 shows the screen after a numeral unit 123 is input. The numerical value 123 is displayed on the numerical section, while the counter value 01 is displayed on the counter section.

A display screen S23 shows the screen in the case where an operator [+] is input as an operator. By inputting the operator [+], the values displayed on the numerical section and the counter section are not changed. A display screen S24 shows the screen in the case where an operator [−] is input as an operator. By inputting the operator [−], the values displayed in the numerical section and the counter section are not changed. At this point, the electronic desk calculator determines that the operator [−] is input as an operator, not the operator [+].

A display screen S25 shows the screen after a numeral unit 10 is input as an operand. As a result, the counter value 02 is displayed on the counter section, while the numerical value 10 is displayed on the numerical section.

A display screen S26 shows the screen after the calculation result key [=] is depressed so as to obtain the result of the operation. As a result, the result of the operation, i.e., 113 is displayed on the numerical section, while the same value as the previous one is still displayed on the counter section.

Figure 6:
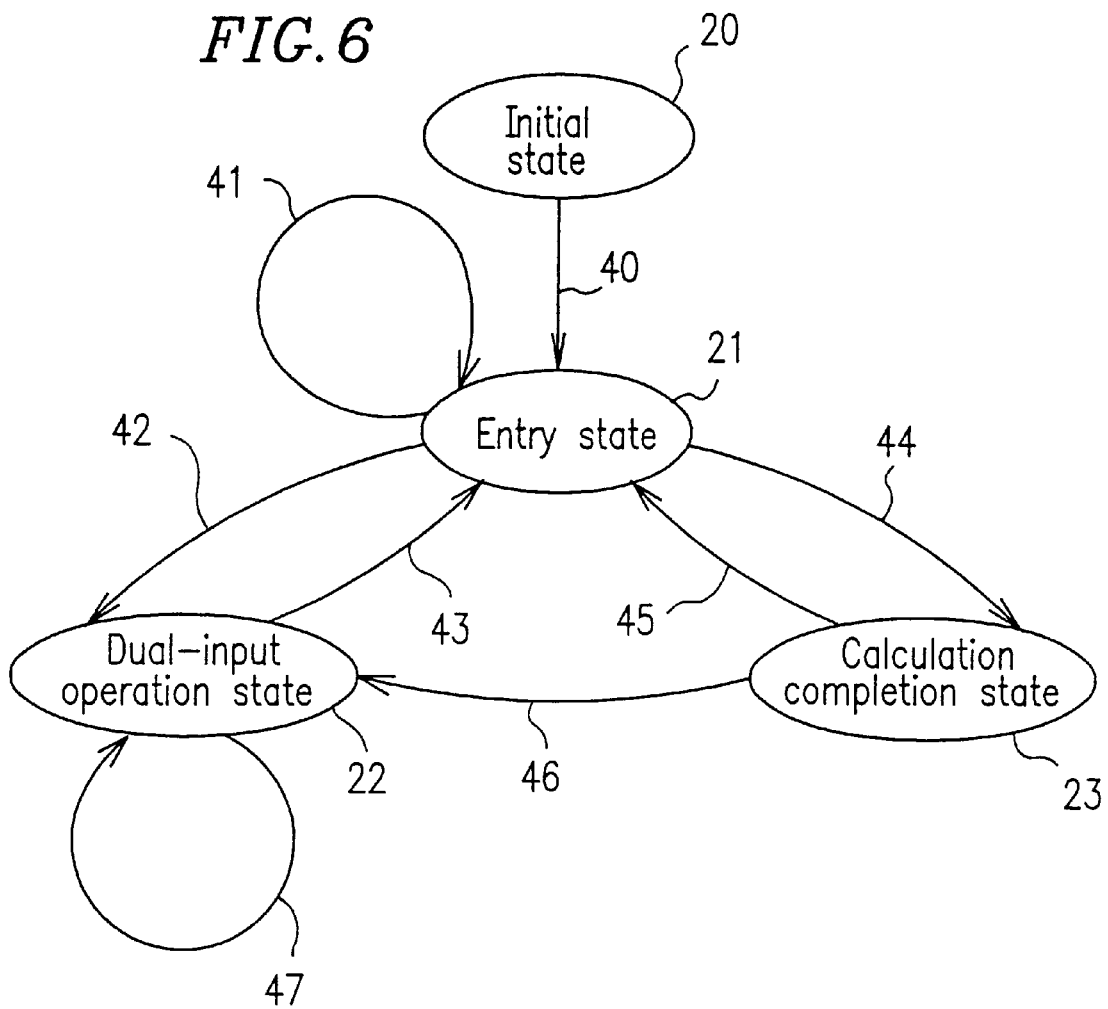
FIG. 6 is an exemplary state transition view in Example 1 according to the present invention.

FIG. 6 shown a state transition of the electronic desk calculator according to the present invention, including the case where the display screen transits from the display screens S21 through S26. Since the same states and paths in FIG. 6 as those shown in FIG. 4 are denoted by the same reference numerals, the description thereof is basically herein omitted.

The case where the dual-input operator key is depressed while the controller 11 of the present invention is in the dual-input operation state 22 will be described below.

For example, if the dual-input operator key is depressed while the controller 11 is in the numeral unit input state or the calculation completion state as described above, the state of the controller 11 according to the present Invention transits to a dual-input operation state.

If the dual-input operator key is depressed while the controller 11 is in a dual-input operation state, the state of the controller 11 transits to the dual-input operation state 22 via a path 47 in response to the signal generated by the dual-input operator key.

The value displayed on the display device 2 in the dual-input operation state 22 is the same as that displayed on the display device 2 in the dual-input operation state 22 before the transition. Dual-input operator data corresponding to the subsequently depressed dual-input operator key is input to the controller 11. In other words, immediately before the controller 11 transits from the dual-input operation state 22 to the entry state 21, the dual-input operator data corresponding to the depressed dual-input operator key is input to the controller 11. The display counter 13c maintains the value stored therein.

Figure 7:
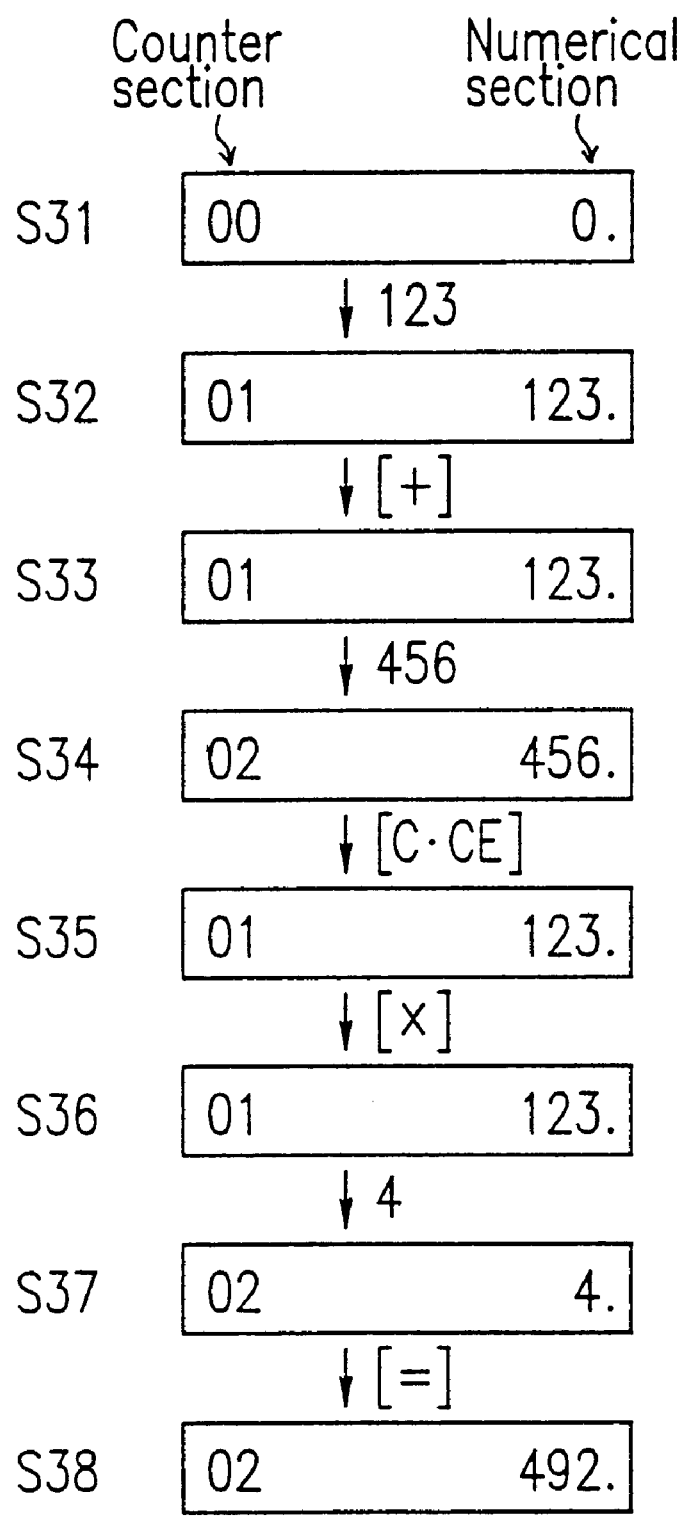
FIG. 7 is an exemplary display screen in Example 1 according to the present invention.

An example of the transition of the display screen of the electronic desk calculator according to the present invention will be described with reference to FIG. 7. In this case, a clear key [C·CE] is depressed while a display screen S34 is In an arbitrary entry state 21. FIG. 7 is a view showing a state transition of the display screen of an electronic desk calculator according to the present invention.

The display screen S31 shows an initial screen of the display 2. A display screen S32 shows a screen after the numeral unit 123 is input as an operand. The numerical value 123 is displayed op the numerical section, while, the counter value 01 is displayed on the counter section.

A display screen S33 shows a screen in the case where an operator [+] is input. By inputting the operator [+], the values displayed in the numerical section and the counter section remain unchanged. A display screen S34 shows a screen after the numeral unit 456 is input as an operand. The numerical value 456 is displayed on the numerical section, while the counter value 02 is displayed on the counter section.

A display screen S35 shows a screen in the case where the clear key [C·CE] is input. As a result, the numeral unit 456 and the operator [+] which have been already input are erased from the controller 11. Therefore, only the numeral unit 123 is stored in the controller 11. Thus, the numerical value 123 is displayed on the numerical section, while the counter value 01 is displayed on the counter section. Only the numeral 456 may be cleared by depressing the clear key [C·CE]. In this case, if an operator is successively depressed, the operator is rendered effective.

A display screen S36 shows a screen in the case where an operator [×] is input. Even if the operator [×] is input, the values displayed on the numerical section and the counter section remain unchanged.

A display screen S37 shows a screen after a numeral unit 4 is input as an operand. The numerical value 4 is displayed on the numerical section, while the counter value 02 is displayed on the counter section.

A display screen S38 shows a screen in the case where a calculation result key [=] is depressed so as to obtain the result of the calculation. The result of the calculation, i.e., 492 is displayed on the numerical section, while the value displayed on the counter section remains unchanged.

Figure 8:
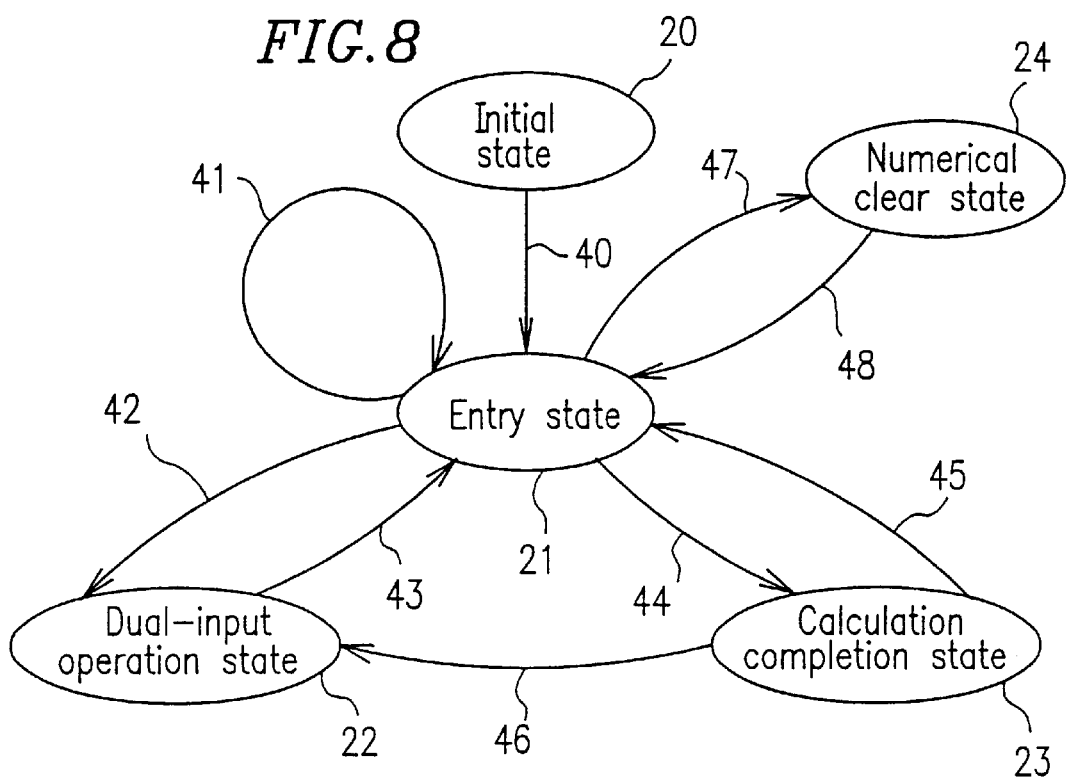
FIG. 8 is an exemplary flow chart in Example 1 according to the present invention.

FIG. 8 shows a state transition of the electronic desk calculator according to the present invention, including the case where a display screen transits from the display screens S31 through S38. Since the same states and paths as those shown in FIG. 4 are denoted by the same reference numerals in FIG. 8, the description thereof is basically herein omitted.

The case where the clear key [C·CE] is depressed while the controller 11 according to the prevent invention is in the entry state 21 will be described below.

When the clear key [C·CE] is depressed, a signal corresponding to the clear key [C·CE] is generated. The controller 11 receives the signal generated by the clear key [C·CE]. In response to the generated signal, the state of the controller 11 transits from the entry state 21 to a numerical clear state 24 via the path 47. As a result, the numeral unit input immediately before the transition to the numerical clear state 24 or the numeral unit and the operator input immediately before the transition to the numerical clear state 24 are cleared. The value stored in the display counter 13c is a value obtained by subtracting one from the value stored in the display counter 13c in the entry state 21 because the input numeral unit is cleared. The subtracted value is displayed on the counter section of the display device 2.

When the numerical key is depressed, the state of the controller 11 transits from the numerical clear state 24 to an entry state 21 via a path 48 in response to the signal generated by the numerical key. Since the subsequent transition is the same as that previously described with reference to FIG. 4, the description thereof is basically herein omitted.

Figure 21:
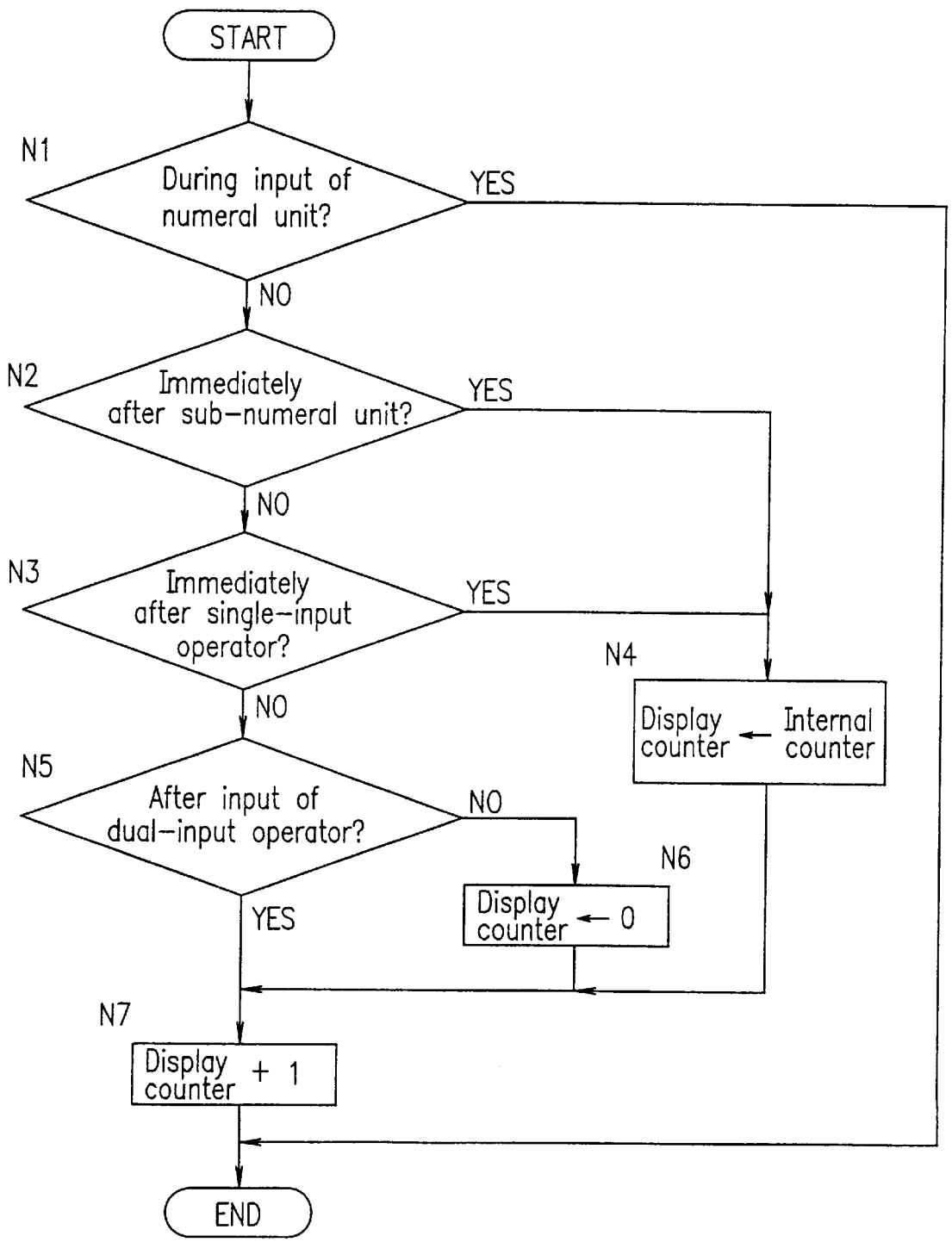
FIG. 21 is an exemplary flow chart of the electronic desk calculator according to the present invention.

FIG. 21 is a flow chart showing an example of the operation of a counter in the case where at least on of numerical keys [0] through [9] and [.] is depressed.

At Step N1, the controller 11 determines whether any numerical key or other key is depressed immediately before the depression of a numerical key. In the case where any numerical key is depressed immediately before the numerical key is depressed, this process is completed. In this case, 1 has been already added to the display counter 13c.

At Step N2, the controller 11 determines whether any sub-numerical key [RM] is depressed immediately before the numerical key is depressed. In the case where any sub-numerical key [RM] is depressed immediately before the depression of the numerical key, the controller 11 stores the value previously stored in the internal counter 13d in the display counter 13c. If the sub-numerical key [RM] is depressed immediately before the depression of the numerical key, the process proceeds to Step N3. In the case where the electronic desk calculator of the present invention does not include the sub-numerical key [RM], the process proceeds to Step N3 with condition.

At Step N3, the controller 11 determines whether or not any single-input operator key such as a square root key is depressed immediately before the depression of the numerical key. In the case where any single-input operator key such as the square root key is depressed immediately before the depression of the numerical key, the process proceeds to Step N4 where the controller 11 stores the value stored in the internal counter 13d in the display counter 13c. in the case where any single-input operator key such as the square root key is not depressed immediately before the depression of the numerical key, the process proceeds to Step N5. If the electronic desk calculator according to the present invention does not include a single-input operator key such as a square root key, the process proceeds to Step N5 without condition.

At Step N5, the controller 11 determines whether or not any dual-input operator key such us an arithmetical operation key is depressed immediately before the numerical key is depressed. In the case where any dual-input operator key such as an arithmetical operation key is depressed immediately before the numerical key is depressed, the process proceeds to Step N7. If not, the process proceeds to Step N6.

At Step N6, the controller 11 stores 0 in the display counter 13c. At Step N7, the controller 11 increases the value stored in the display counter 13c by one.

Figure 23:
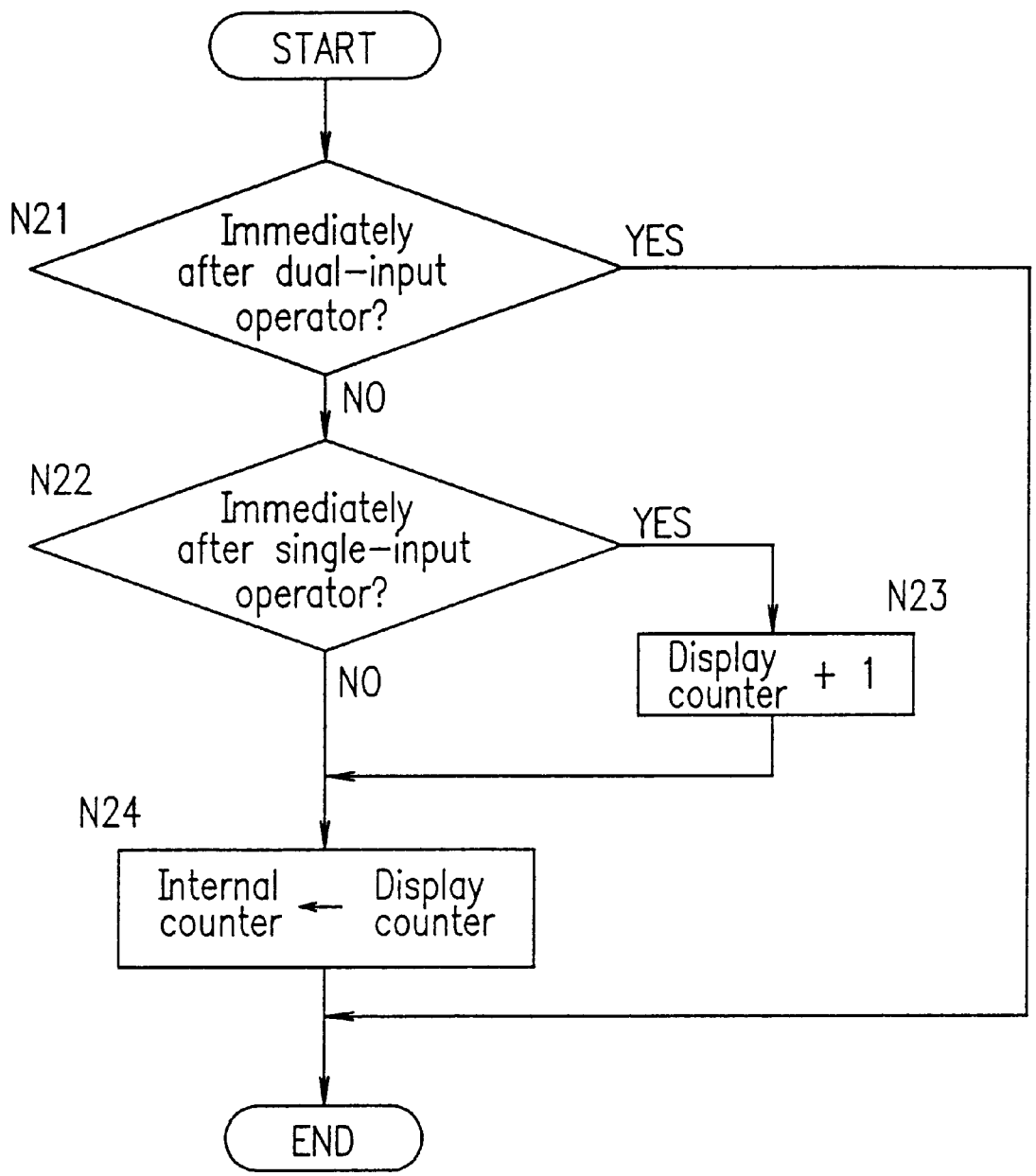
FIG. 23 is an exemplary flow chart of the electronic desk calculator according to the present invention.

FIG. 23 is a flow chart showing an example of the operation of a counter in the case where the dual-input operator keys [+] and [×] are depressed.

At Step N21, the controller 11 determines whether any dual-input operator key or other key is depressed immediately before the dual-input operator key 48 depressed. In the case where another dual-input operator key is depressed immediately before the dual-input operator key is depressed, this process is ended.

The case where another dual-input operator key is depressed immediately before the depression of the dual-input operator key includes, for example, the case where a key [+] is depressed instead of a key [−] which should have been depressed. In this case, since the process for the counter has been already finished, the counter process is ended. In the case where another dual-input operator key is not depressed immediately before another dual-input operator key is depressed, the process proceeds to Step N22.

At Step N22, the controller 11 determines whether or not any single-input operator key is depressed immediately before the dual-input operator key is depressed. In the case where any single-input operator key is depressed immediately before the dual-input operator key is depressed, the process proceeds to Step 123. If not, the process proceeds to Step N24.

At Step N23, the controller 11 increases the value stored in the display counter 13c by one, and the process proceeds to Step N24. At Step N24, the controller 11 stores the value stored in the display counter 13c in the internal counter 13d.

Step N20 (not shown) may be executed after the calculation of a certain expression. Step N20 for clearing the display counter 13c and increasing the value stored in the display counter 13c by one may be added before Step N21.

Figure 26:
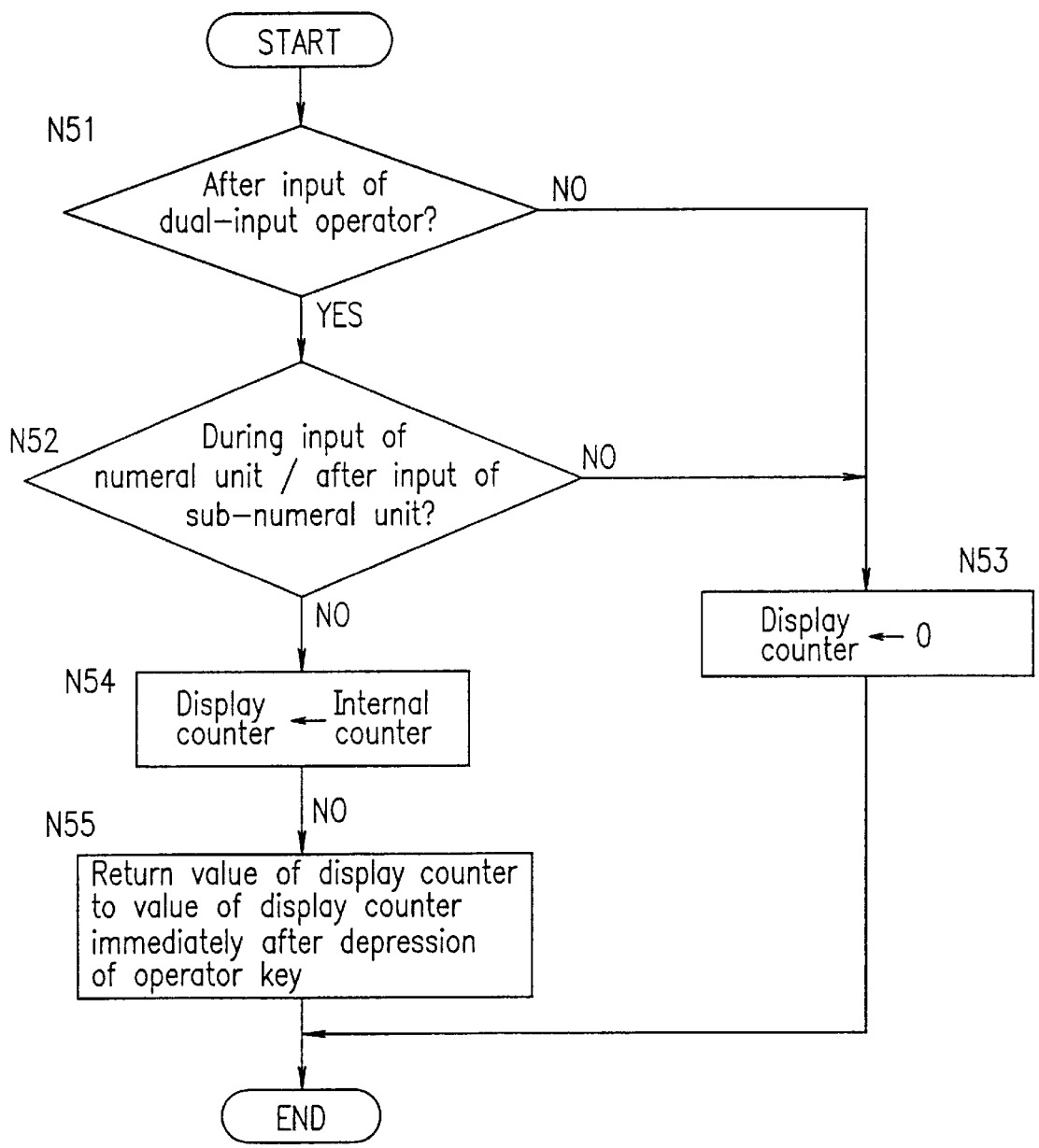
FIG. 26 is an exemplary flow chart of the electronic desk calculator according to the present invention.

FIG. 26 is a flow chart showing an example of the operation of the counter in the case where a clear key [C·CE] is depressed. When the clear key [C·CE] is depressed, the numeral units input before the depression of the clear key [C~CE] are cleared. Therefore, the counter returns to the state immediately after the operator key is depressed.

At Step N51, the controller 11 determines whether or not any operator key is depressed before the clear key [C·CE] is depressed. In the case where any operator key is depressed before the clear key [C·CE] is depressed, the process proceeds to Step N52. If not, the process proceeds to Step N53.

At Step N52, the controller 11 determines whether or not any numerical key or any sub-numerical key is depressed before the clear key [C·CE] is depressed. In the case where any numerical key or any sub-numerical key is depressed before the clear key [C~CE] is depressed, the process proceeds to Step N54. If not, the process proceeds to Step N53.

At Step N53, the controller 11 stores 0 in the display counter 13c.

At Step N54, the controller 11 stores the value of the internal counter 13d in the display counter 13c.

At Step N55, the counter value displayed on the display counter 13c is returned to the value displayed on the display counter 13c immediately after the operator is input. Even when an operator is input, the value displayed on the display counter 13c remains unchanged.

EXAMPLE 2

The electronic desk calculator 1 includes the display device 2, the keyboard 3, the controller 11, the ROM 12 and the RAM 13.

The display device 2 displays a numeral unit, the result of the calculation and a value stored in the display counter 13c. The display device 2 may be a liquid crystal display device.

The keyboard 3 includes a numerical key for inputting a numeral unit, a decimal point key, an operator key, and a calculation result key such as [=]. When a certain key on the keyboard 3 is depressed, a signal corresponding to the depressed key is output to the controller 11.

The controller 11 receives a signal from the keyboard 3, and determines which key on the keyboard 3 is depressed based on the signal. The controller 11 performs a calculation process including arithmetical operations, a counting process for the display counter 13c and the internal counter 13d, and a display process of the result.

The ROM 12 stores a program for performing the above-mentioned process, a program for generating the computer graphics, or the like.

The RAM 13 includes an X register 13a, a Y register 13b, a display counter 13c, an internal counter 13d, and an operator register 13f, and a work area required for other operations.

The X register 13a stores a value of the numeral unit and a value of the result of the calculation or the like. The value stored in the X register 13a is displayed on the numerical section of the display device 2. The operator register 13f stores an operator input by an operator key (+, −, ×, ÷ or the like).

Figure 9:
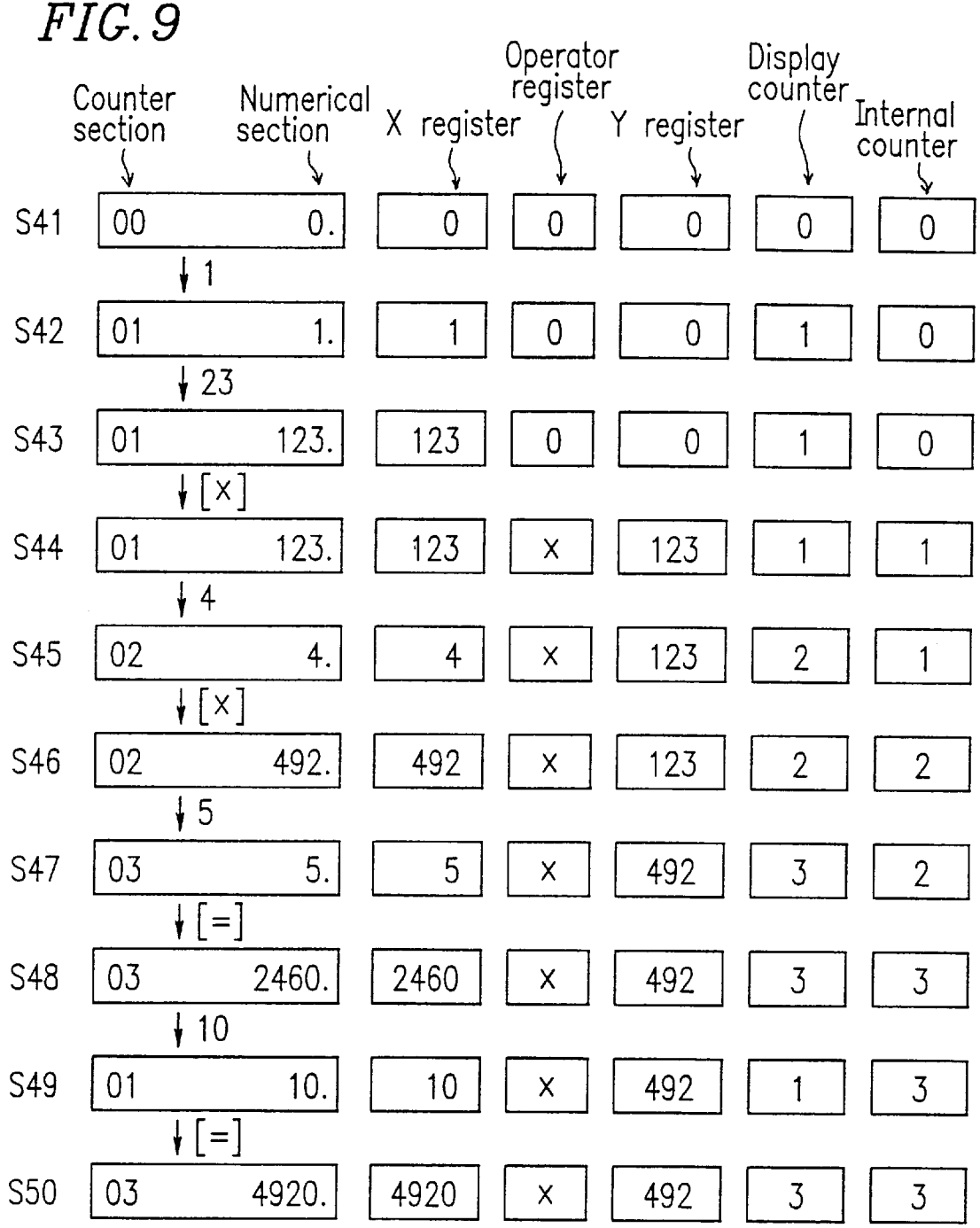
FIG. 9 is an exemplary display screen in Example 2 according to the prevent invention.

An example of the operation of the electronic desk calculator of Example 2 will be described with reference to FIG. 9. FIG. 9 shows the relationship between the transition of a display screen of the display device 2 of Example 2, the transition of the value stored in each register and the transition of the value stored in each counter.

A display screen S41 shows an initial screen of the display device 2. In this case, values stored in the X register 13a, the operator register 13f, the Y register 13b, the display counter 13c, and the internal counter 13d are respectively 0. The value stored in the operator register 13f may be an arbitrary value.

A display screen S42 shows a screen in the case where a head 1 of a numeral unit 123 is input. When the head 1 of the numeral unit is input, the counter value 01 is displayed on the counter section while the numerical value 1 is displayed on the numerical section. The X register 13a stores 1, while the display counter 13c stores 1. The operator register 13f, the Y register 13b, and the internal counter 13d maintain the previous values, that is, 0.

A display screen S43 shows a screen after the input of the numeral unit 123 is completed. The numerical value 123 is stored on the numerical section, while the value displayed on the counter section remains unchanged. The X register 13a stores 123. The display counter 13c maintains 1, while the operator register 13f, the Y register 13b and the internal counter 13d maintain the previous values, that is, 0.

A display screen S44 shows a screen in the case where an operator [×] is input. In this case, the Y register 13b stores the value which is previously stored in the X register 13a, while the X register 13a maintains 123. The values displayed on the numerical section and the counter section respectively remain unchanged. The display counter 13c maintains 1. The operator register 13f stores "×". Since the operator is input, 1 is stored in the internal counter 13d.

A display screen S45 shows a screen in the case where a numeral unit 4 is input as an operand. In this case, the counter value 02 is displayed on the counter section, while the numerical value 4 is displayed on the numerical section. The X register 13a stores 4, while the display counter 13c stores 2. The Y register 13b, the operator register 13f, and the internal counter 13f maintain the previous values, respectively.

A display screen S46 shows a screen in the case where an operator [×] is input. In this case, the result of operation, that is, 492 is displayed on the numerical section, while the value displayed in the counter section remains unchanged. The X register 13a stores the value representing the result of the operation, that is, 492, while the internal counter 134 stores 2. The Y register 13b maintains the previous value, 123, the display counter 13c maintains the previous value, 2. The operator register 13f maintains the previous operator, "×".

A display screen S47 shows a screen after a numeral unit 5 in input as an operand. In this case, the counter value 03 is displayed on the counter section, while the numerical value 5 is displayed on the numerical section. The Y register 13b stores the value previously stored in the X register 13a, 492, while the X register 13a stores 5. The display counter 13c stores 3. The operator register 13f and the internal counter 13d maintain the previous values, respectively.

A display screen S46 shows a screen after a calculation result key [=] is input. The result of the calculation, that is, 2460, is displayed on the numerical section, while the value displayed in the counter section remains unchanged. In this case, the X register 13a stores the result of the calculation, that is, 2460, while the internal counter 13d stores 3. The Y register maintains the previous value, 492, while the display counter 13c maintains the previous value, 3. The operator register 13f maintains the previous operator, "×".

A display screen S49 shows the screen after a numeral unit 10 is input as an operand after the above-mentioned operation. In this case, the counter value 01 is displayed on the counter section, while the numerical value 10 is displayed on the numerical section. The X register 13a stores 10, while the display counter 13c stores 1. The Y register 13b maintains the previous value, 492, while the Internal counter 13d maintains the previous value, 3. The operator register 13f also maintains the previous operator, "×".

A display screen S50 shows the screen after a calculation result key [=] is input so as to obtain the result of the operation. The result of the operation, 4920 is displayed on the numerical section, while the counter value 03 is displayed on the counter section. In this case, the X register 13a stores the result of the calculation, that is, 4920, while the internal counter 13d maintains the previous value, 3. The display counter 13c stores the value previously stored in the internal counter 13d. The Y register 13b maintains the previous value, 492, while the operator register 13f maintains the previous operator, "×".

Figure 10:
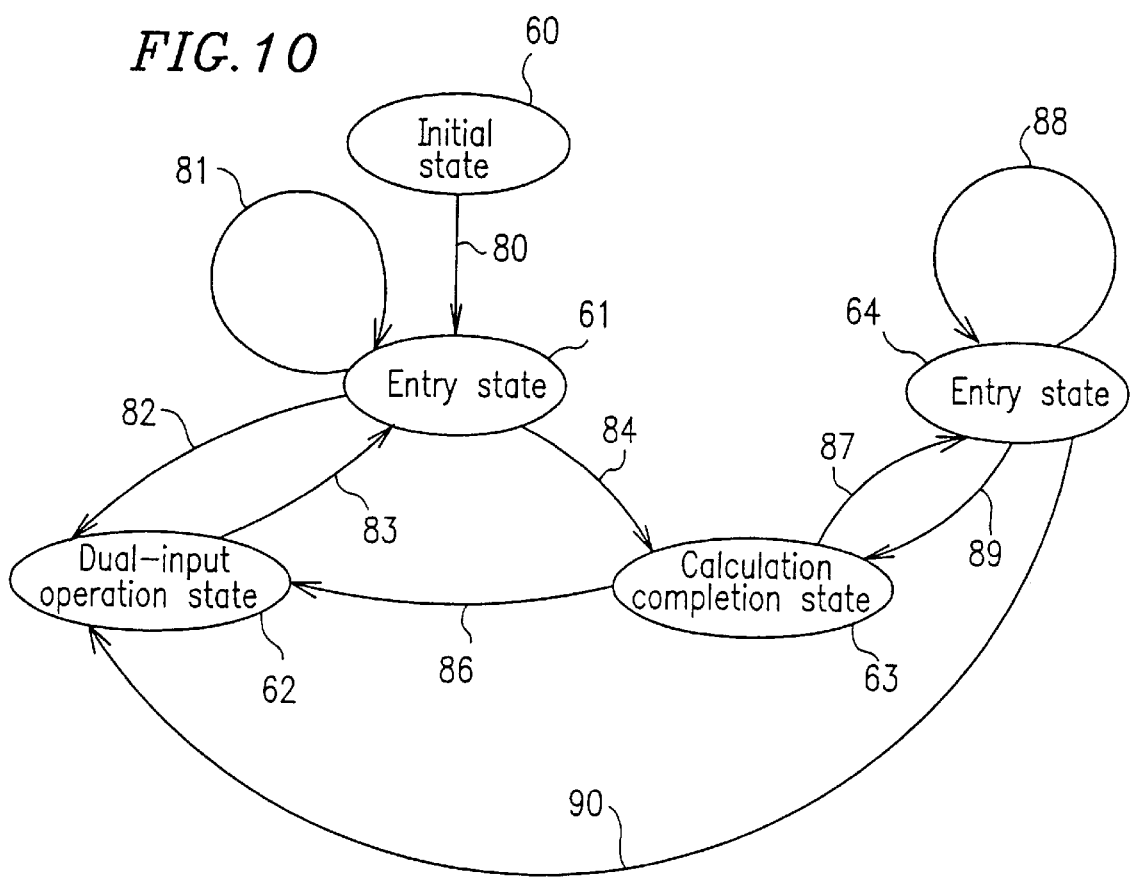
FIG. 10 is an exemplary state transition view in Example 2 according to the present invention.

The operation of the electronic desk calculator according to the present invention, including the case where the display device 2 of the electronic desk calculator according to the present invention displays the display screens S41 to S50 will be described with reference to FIG. 10. FIG. 10 shows an example of the state transition of the electronic desk calculator of the present invention.

A user turns a power switch ON or depresses a clear key [C], whereby the electronic desk calculator of the present invention is set at an initial state 60. The values stored in the X register 13a, the operator register 13f, the Y register 13b, the display counter 13c, and the internal counter 13d are respectively 0. The values stored in the operator register 13f and the Y register 13b may be arbitrary values other than 0.

When the numerical key is depressed, a signal corresponding to the numerical key is generated. The controller 11 receives the signal generated by the numerical key, In response to the generated signal, an initial state 60 transits to an entry state 61 via a path 80. As a result, the controller 11 increases the value stored in the display counter 13c by one. More specifically, the controller 11 recalls the value stored in the display counter 13c so as to increase the value stored in the display counter 13c by one. Then, the increased value is stored in the display counter 13c. The controller 11 stores a value corresponding to the numerical key in the X register 13a. In response to such a transition, the value stored in the X register 13a is displayed on the numerical section of the display device 2. The value stored in the display counter 13c is displayed on the counter section of the display device 2. The operator register 13f, the Y register 13b and the internal counter 13d maintain the values prior to the transition of the state, that is, 0.

When the numerical key is depressed, the controller 11 receives the signal generated by the numerical key as described above. In response to the generated signal, the entry state 61 transits to the entry state 61 via a path 81. The controller 11 recalls the value stored in the X register 13a, and than multiplies the recalled value by 10. If the numerical key is successively depressed, such an operation is repeated. Furthermore, the controller 11 adds the product to a numerical value corresponding to the numerical key, and stores the sum to the X register 13a. The value stored in the X register 13a is displayed on the numerical section. The display device 2 displays the value stored in the display 13c. The operator register 13f, the Y register 13b, and the internal counter 13d maintain the values prior to the transition.

When a dual-input operator key is depressed, a signal corresponding to the dual-input operator key is generated. The controller 11 receives the signal generated by the dual-input operator. In response to the generated signal, the entry state 61 transits to a dual-input operation state 62 via a path 82. As a result of this, the controller 11 stores an operator corresponding to the dual-input operator key in the operator register, recalls the value stored in the X register 13a, and stores the recalled value in the Y register 13b. The value displayed on the display device 2 in the dual-input operation state 62 is the same as that displayed on the display device 2 in the entry state 61. The X register 13a and the display counter 13c maintain the values prior to the transition of the state. When the controller 11 detects the depression of the dual-input operator key, the controller 11 increases the value stored in the internal counter 13d by one. More specifically, the controller 11 recalls the value stored in the internal counter 13d, increases the value stored in the internal counter 13d by one, and stores the increased value in the internal counter 13d.

When the numerical key is depressed, the controller 11 receives the signal generated by the numerical key as described above. In response to the generated signal, a dual-input operation state 62 transits to the entry state 61 via a path 83. As a result, the controller 11 increases the value stored in the display counter 13c by one, while the display device 2 displays the value stored in the display counter 13c. The controller 11 stores the value corresponding to the numerical key in the X register 13a. The display device 2 displays the value stored in the X register 13a. The operator register 13f, the Y register 13b, and the internal counter 13d maintain the values prior to the transition of the state.

When the calculation result key [=] is depressed, a signal corresponding to the calculation result key is generated, The controller 11 receives the signal generated by the calculation result key [=]. In response to the generated signal, the entry state 64 transits to a calculation completion state 63 via a path 89. As a result, the value stored in the X register 13a and the value stored in the Y register 13b are calculated based on the operator stored in the operator register. The controller 11 stores the result of the calculation in the X register 13a. Then, the controller 11 recalls the value in the internal counter 13d, and stores the recalled value in the display counter 13c. The display device 2 displays the values stored in the X register 13a and the display register. The Y register 13b, the operator register 13f and the display counter 13c maintain the values prior to the transition.

When the numerical key is depressed in a entry state 64, the entry state 64 transits to the entry state 64 via a path 88. Since change in each of the registers and each of the counters is the some as that in the case where the entry state 61 transits to the entry state 61 via a path 81, the description thereof is basically herein omitted.

If the dual-input operator key is depressed in the entry state 64, the entry state 64 transits to the dual-input operation state 62 via the path 90. As a result, the controller 11 stores the operator corresponding to the dual-input operator key in the operator register. The value displayed on the display device 2 in the dual-input operation state 62 is the same an that displayed on the display device 2 in the entry state 64. The X register 13a and the display counter 13c maintain the values prior to the transition of the state. When the controller 11 detects the depression of the dual-input operator key, the controller 11 increases the value stored in the internal counter 13d by one, recalls the value stored in the X register 13a, and stores the recalled value in the Y register 13b.

If the dual-input operator key is depressed in the calculation completion state 63, the calculation completion state 63 transits to the dual-input operation state 62 via a path 86. As a result, the controller 11 stores the operator corresponding to the dual-input operator key in the operator register. The value displayed on the display device 2 in the dual-input operation state 62 is the same as that displayed on the display device 2 in the calculation completion state 63. The X register 13a, the display counter 13c and the Y register 13b maintain the values prior to the transition of the state. If the controller 11 detects the depression of the dual-input operator key, the controller 11 increases the value stored in the internal counter 13d by one.

Figure 25:
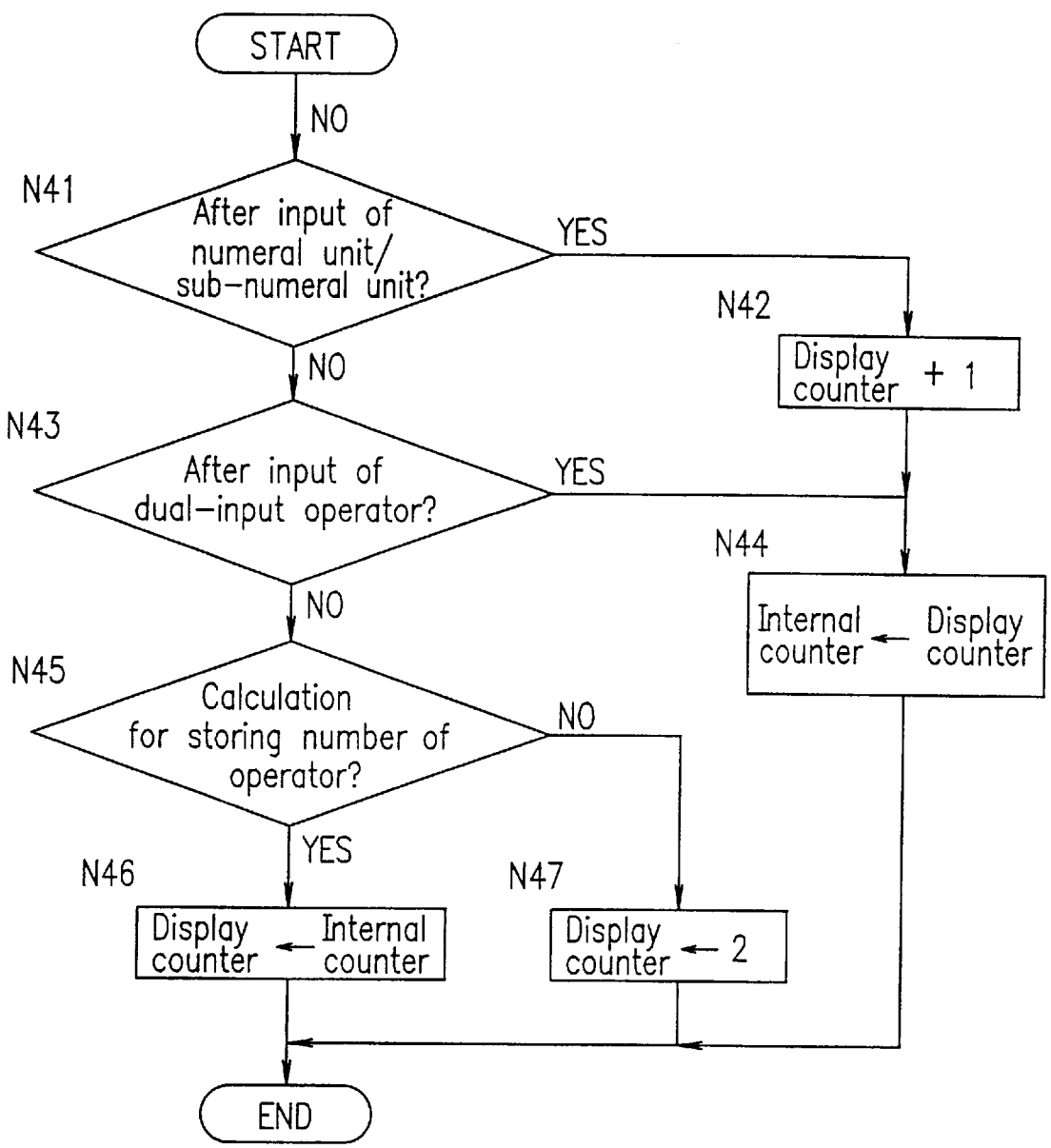
FIG. 25 is an exemplary flow chart of the electronic desk calculator according to the present invention.

FIG. 25 is a flow chart showing an example of the operation of the counter in the case where the calculation result key such as [=] or [%] is depressed.

At Step N41, the controller 11 determines whether or not any numerical key or any sub-numerical key is depressed prior to the depression of the calculation result key. In the case where any numerical key or any sub-numerical key is depressed immediately before the depression of the calculation result key, the process proceeds to Step N43. If not, the process proceeds to Step N42.

At Step N42, the controller 11 increases the value stored in the display counter 13c by one so as to count the number of the omitted numerical units or the number of numerical units used for calculating the value obtained by depressing the calculation result key.

At Step N43, the controller 11 determines whether or not any dual-input operator key is depressed prior to the depression of the calculation result key. In the case where any dual-input operator key is depressed before the depression of the calculation result key, the process proceeds to Step N44. If not, the process proceeds to Step N45.

At Step N44, in order to memorize the value of the display counter displayed by the display device 2 as an actual count number, the controller 11 stores the value stored in the display counter 13c in the internal counter 13d.

At Step N45, the controller 11 determines whether or not a calculation to be performed is a calculation for storing the number of operator. If the calculation is the calculation for storing the number of operators, the process proceeds to Step N47. If not, the process proceeds to Step N46.

At Step N46, the controller 11 stores the value stored in the internal counter 13d in the display counter 13c.

At Step N47, the controller 11 stores 2 in the display counter 13c. This value represents the number of counts in the came where the numerical units are calculated based on the stored operands and the stored operators.

Although not shown in the figure, Step N40 may be executed after the completion of a calculation of a certain expression. Step N40 for clearing the display counter 13c and increasing the value stored in the display counter 13c by one may be added prior to Step N41.

EXAMPLE 3

The electronic desk calculator 1 of Example 3 according to the present invention includes the display device 2, the keyboard 1, the controller 11, the ROM 12 and the RAM 13.

The display device 2 displays a numeral unit, the result of the operation and a value stored in the display counter 13c. The display device 2 may be a liquid crystal display device.

The keyboard 3 includes a numerical key for inputting a numeral unit, a decimal point key, an operator key, and a calculation result key such as [=], key [tax] depressed for obtaining the amount including tax or the amount of tax.

When a particular key on the keyboard 3 is depressed, a signal corresponding to the particular key is output to the controller 11. The controller 11 receives a signal from the keyboard 3, and determines which key on the keyboard 3 is depressed. The controller 11 performs a calculation process including arithmetical operations, a counting process for the display counter 13c and the internal counter 13d, a comparison process upon verification, and a display process of the result of the calculation.

The ROM 12 story a program for performing the above-mentioned process, a program for generating the computer graphics, or the like.

The RAM 13 includes the operator register 13f for storing an operator corresponding to operator keys (+, −, ×, ÷ or the like) and the display counter 13c.

Like the RAM 13 in Example 2, the RAM 13 in Example 3 may include the X register 13a, the Y register 13b and the internal counter 13d.

Figure 11:
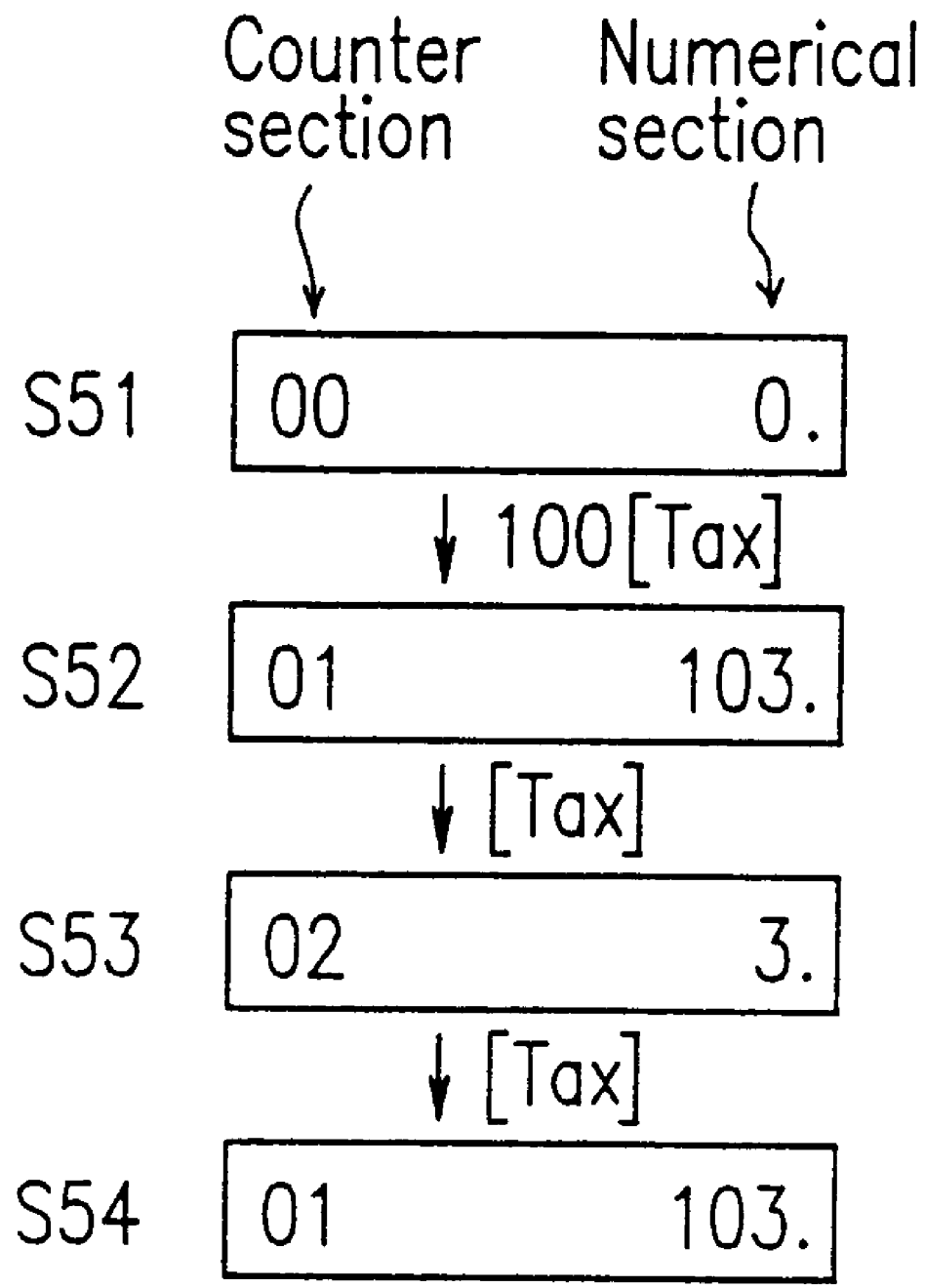
FIG. 11 is an exemplary display screen in Example 3 according to the present invention.

An example of the operation of the electronic dank calculator of Example 3 will be described with reference to FIG. 11. FIG. 11 shows the relationship between the transition of a display screen of the display device 2 of Example 3 and the data input through the keyboard 3.

A display screen S51 shows an initial screen of the display device 2. The counter value 00 is displayed on the counter section, while the numerical value 0 is displayed on the numerical section.

A display screen 52 show a display screen after a numeral unit 100 is input and subsequently a key [tax] is depressed. On the display agrees, an amount including tax 103 with respect to the numeral unit 100 is displayed in the numerical section, while the counter value 01 is displayed on the counter section.

A display screen S53 shows a display screen immediately after the key [tax] is depressed. On the display screen, a tax 3 with respect to the numeral unit 100 is displayed on the numerical section, and the counter value 02 is displayed on the counter section.

A display screen S54 shows a display screen after the key [tax] is depressed again. On the display screen, an amount including tax 103 with respect to the numeral unit 100 is displayed in the numerical section, while the counter value 01 is displayed on the counter section.

Figure 12:
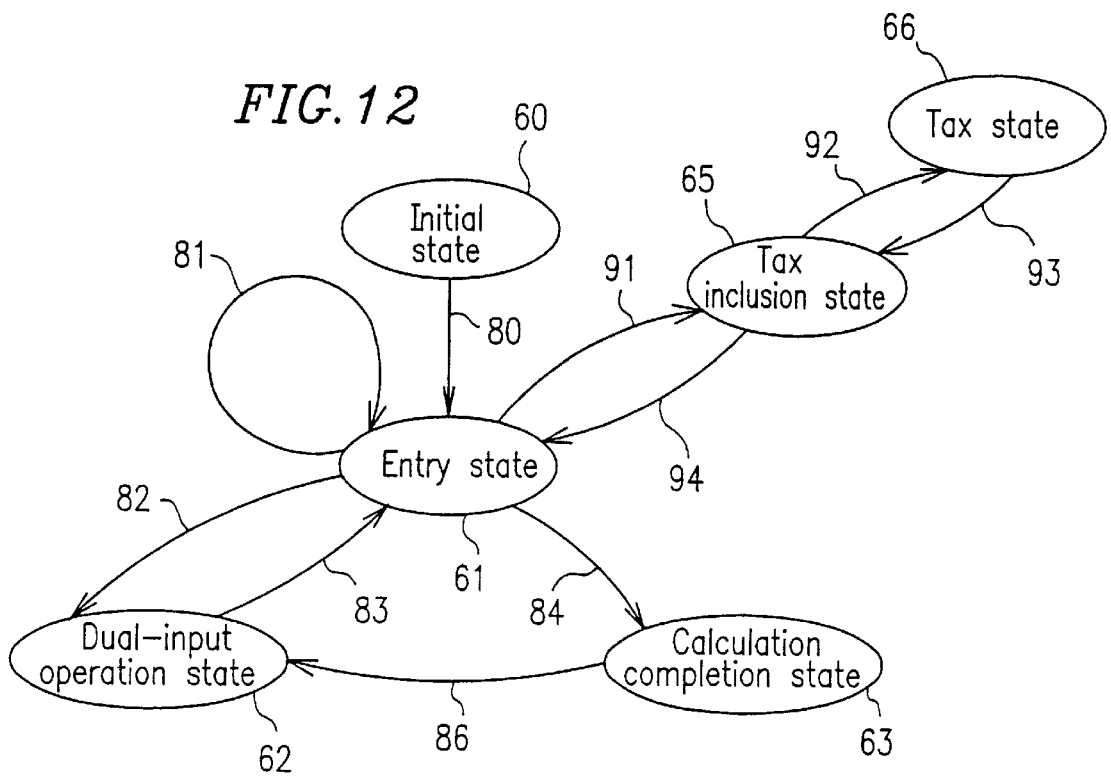
FIG. 12 is an exemplary state transition view in Example 3 according to the present invention.

The operation of the electronic desk calculator according to the present invention, including the case where the display device 2 of the electronic desk calculator according to the present invention displays the display screens S51 through S54 described above, will be described with reference to FIG. 12. FIG. 12 shows an example of the state transition of the electronic desk calculator according to the prevent invention.

A user turns a power switch ON or depresses a clear key [C], whereby the electronic desk calculator according to the present invention is set at an initial state 60.

When the numerical key is depressed, the signal corresponding to the depressed numerical key is generated. The controller 11 receives the signal generated by the numerical key. In response to the generated signal, the initial state 60 transits to the entry state 61 via the path 80. As a result, the controller 11 increases the value stored in the display counter 13c by one. More specifically, the controller 11 recalls the value stored in the display counter 13c, increases the value stored in the display counter 13c by one, and stores the increased value in the display counter 13c. In response to such transition, the controller 11 outputs the signal generated by the numerical key to the display device 2. A numerical character corresponding to the numerical key is displayed on the numerical section of the display device 2 based on the signal generated by the numerical key. The value stored in the display counter 13c is displayed on the counter section of the display device 2.

When the numerical key is depressed, the controller 11 receives the signal generated by the numerical key as described above. In response to the generated signal, the entry state 61 transits to the entry state 61 via a path 81. As a result, the controller 11 outputs the signal generated by the numerical key to the display device 2. The numerical character corresponding to the numerical key is displayed on the numerical section of the display device 2 based on the signal. Since the display counter 13*c* maintains the value stored therein, the value displayed in the counter section of the display device 2 remains unchanged.

When the key [tax] is depressed, a signal corresponding to the key [tax] is generated. The controller 11 receives the signal generated by the key [tax]. In response to the generated signal, the entry state 61 transits to a tax inclusion state 65 via a path 91.

As a result, the controller 11 calculates the amount including tax and the amount of tax with respect to the numeral unit input through the numerical key. Specifically, in order to obtain the amount including tax, the controller 11 multiplies the numeral unit input through the numerical key by 1.03. In order to obtain the amount of tax, thy controller 11 multiplies the numeral unit input through the numerical key by 0.03. The controller 11 stores the result of the calculation. Next, the controller 11 stores 1 in the display counter 13*c*. The display device 2 displays the value obtained by multiplying the numeral unit by 1.03 and displays the value stored in the display counter 13*c*.

Then, when the key [tax] is depressed again, the tax inclusion state 65 transits to the tax state 66 via a path 92 in response to the signal corresponding to the key [tax]. As a result, the controller 11 stores 2 in the display counter 13*c*. The display device 2 displays the value previously obtained by multiplying the numeral unit by 0.03 and displays the value stored in the display counter 13*c*.

Subsequently, when the key [tax] is depressed again, the tax state 66 transits to the tax inclusion state 65 via a path 93 in response to the signal corresponding to the key [tax]. As a result, the controller 11 stores 1 in the display counter 13*c*. The display device 2 displays the value previously obtained by multiplying the numeral unit by 1.03 and displays the value stored in the display counter 13*c*.

By successively depressing the key [tax], the amount of tax and the amount including tax can be displayed on the numerical section of the display device 2 in an alternate manner.

In the case where RAM 13 of Example 3 includes the X register 13*a*, the Y register 13*b*, and the internal counter 13*d*, the electronic desk calculator of Example 3 operates in the same manner as the electronic desk calculator of Example 2.

Figure 28:
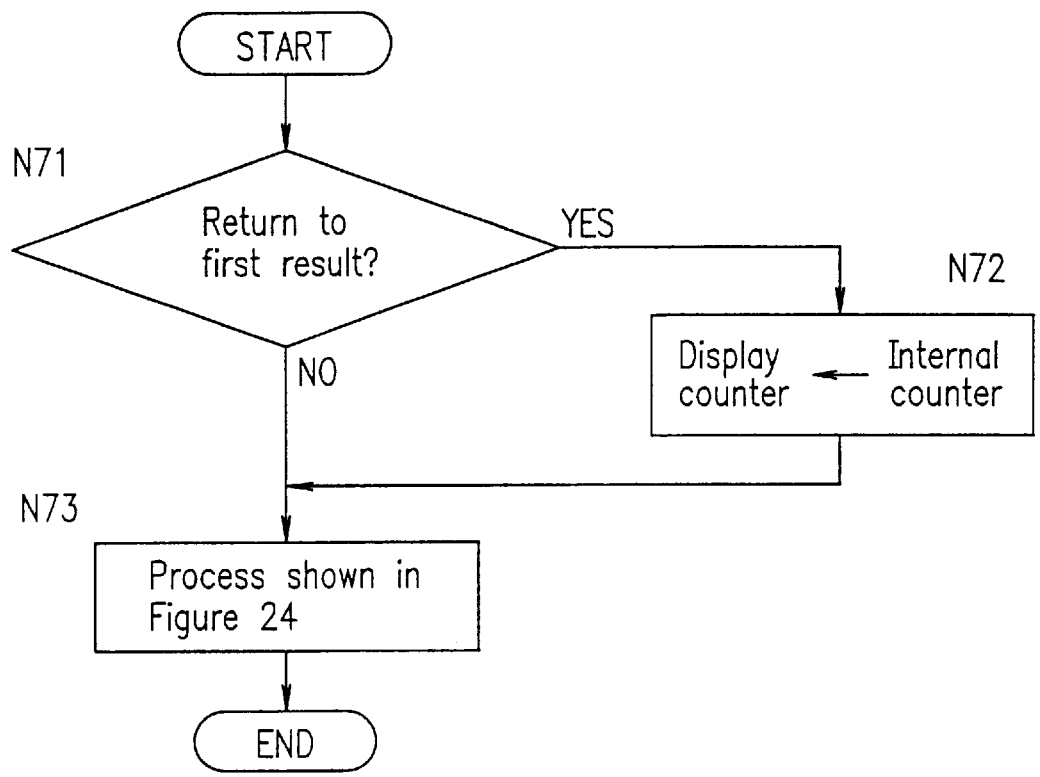
FIG. 28 is an exemplary flow chart of the electronic desk calculator according to the present invention.

The operation of the electronic desk calculator 1 in Example 3 in the case where the electronic desk calculator 1 further Includes the internal counter 13*d* will be described below. FIG. 28 is a flow chart showing an example of the operation of the counter in the case where the some key such an the key [tax] is successively depressed.

At Step N71, the controller 11 determines whether or not the value displayed on the display device 2 represents the first result of the calculation. In the case where the value displayed on the display device 2 is the first result of the calculation, the process proceeds to Step N72. If not, the process proceeds to Step N73.

At Step N72, the controller 11 returns the display counter 13*c* to its state prior to the depression of the operator key. In the case where the electronic desk calculator includes the internal counter 13*d*, the controller 11 may store the value of the internal counter 13*d* in the display counter 13*c*. In the came where two values are displayed by the key [tax] in an alternate manner, the controller 11 may subtract 2 from the value stored in the display counter 13*c*.

At Step N73, Steps N31 to N33 shown in FIG. 24 and described below will be performed.

Although not shown in the figure, Step N70 may be executed after the completion of the calculation of a certain expression. Step N70 for clearing the display counter 13*c* and increasing the value stored in the display counter 13*c* by one may be added prior to Step N71.

EXAMPLE 4

The electronic desk calculator 1 of Example 4 according to the present invention includes the display device 2, the keyboard 3, the controller 11, the ROM 12 and the RAM 13.

The display device 2 displays a numeral unit, the result of the operation and a value stored in the display counter 13*c*. The display device 2 may be a liquid crystal display device.

The keyboard 3 includes a numerical key for inputting a numeral unit, a decimal point key, an operator key, and a calculation result key such as [=], and a key [tax] depressed for obtaining the amount including tax or the amount of tax.

When a particular key on the keyboard 3 is depressed, a signal corresponding to the particular key is output to the controller 11. The controller 11 receives a signal from the keyboard 3, and determines which key on the keyboard 3 is depressed. The controller 12 performs a calculation process including arithmetical operations, a counting process for the display counter 13*c* and the internal counter 13*d*, a comparison process upon verification, and a display process of the result of the calculation.

The ROM 12 stores a program for performing the above-mentioned process, a program for generating the computer graphics, or the like.

The RAM 13 includes the operator register 13*f* for storing an operator corresponding to operator keys (+, −, ×, ÷ or the like) and the display counter 13*c*.

Like the RAM 13 in Example 2, the RAM 13 in Example 4 may include the X register 13*a*, the Y register 13*b* and the internal counter 13*d*.

Figure 13:
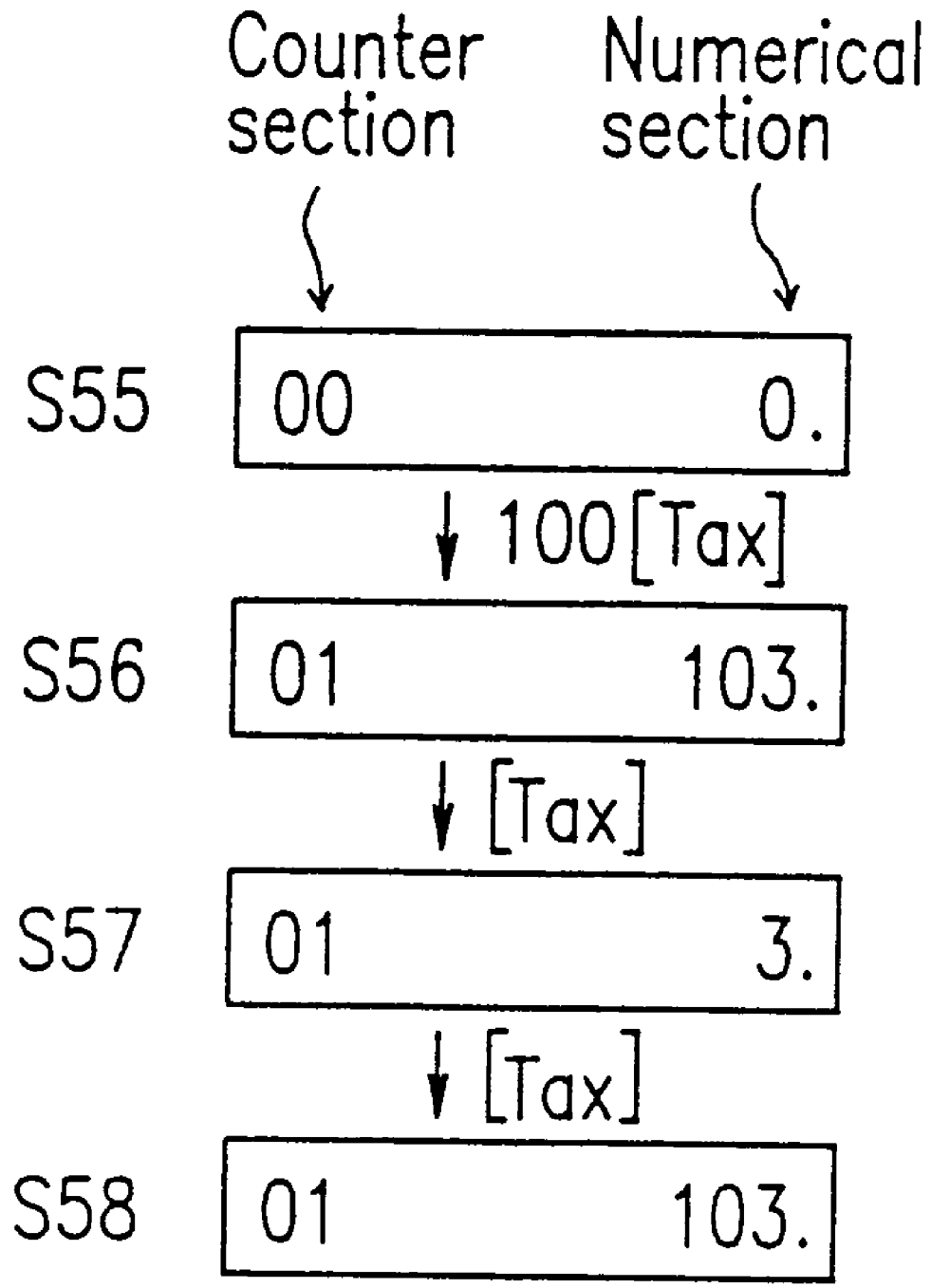
FIG. 13 is an exemplary display screen in Example 4 according to the present invention.

An example of the operation of the electronic desk calculator of Example 4 will be described with reference to FIG. 13. FIG. 13 shows the relationship between the transition of a display screen of the display device 2 of Example 4 and data input through the keyboard 3.

A display screen S55 shows an initial screen of the display device 2. The counter value 00 is displayed on the counter section, while the numerical value 0 is displayed on the numerical section.

A display screen S56 shows a display screen immediately after the input of a numeral unit 100, followed by the depression of the key [tax]. The amount including tax 103 with respect to the numeral unit 100 is displayed on the numerical section, while the counter value 01 is displayed on the counter section.

A display screen S57 shows a display screen after the key [tax] is depressed again. The amount of tax 3 with respect to the numeral unit 100 is displayed on the numerical section, while the counter value 01 is displayed on the counter section.

A display screen S58 shows a display screen after the key [tax] in depressed once more. The amount including tax 103 with respect to the numeral unit 100 is displayed an the numerical section, while the counter value 01 is displayed on the counter section.

Figure 14:
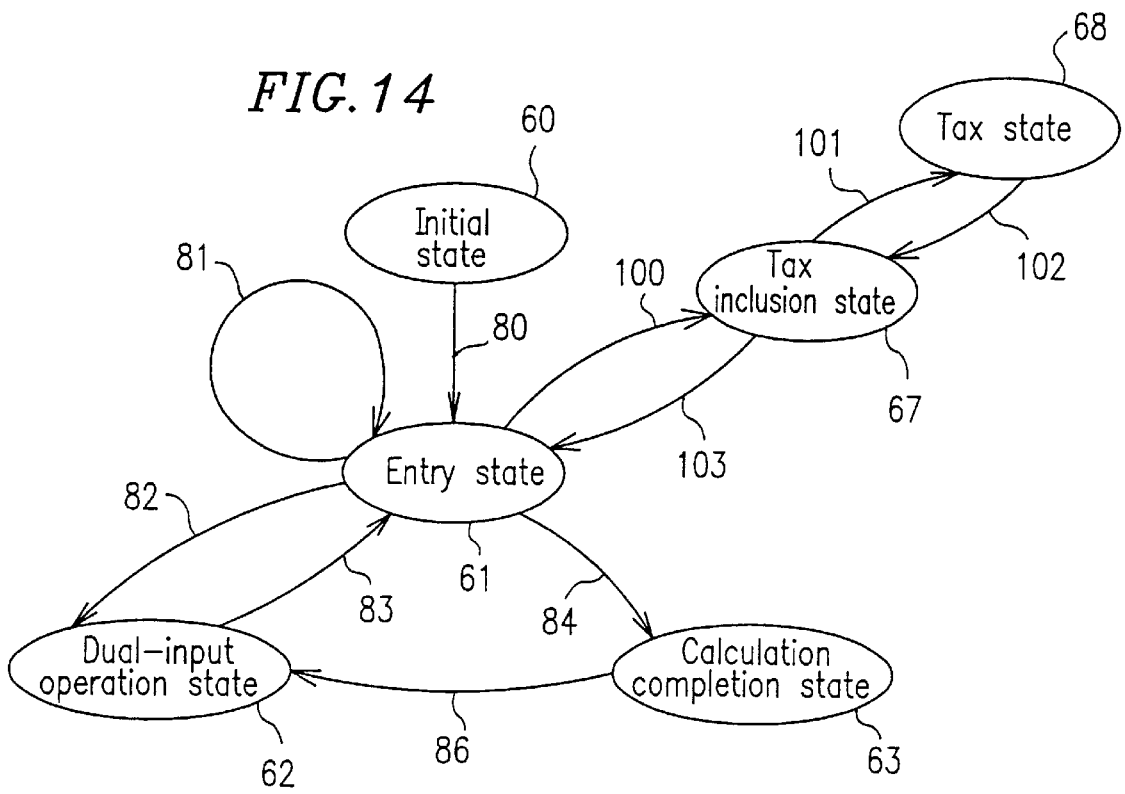
FIG. 14 is an exemplary state transition view in Example 4 according to the present invention.

The operation of the electronic desk calculator 2 according to the present invention in the case where the electronic desk calculator displays the display screens S55 through S58 described above will be described with reference to FIG. 14. FIG. 14 shows an example of the state transition of the electronic desk calculator according to the present invention.

The user turns a power switch ON or depresses a clear key [C], whereby the electronic desk calculator according to the prevent invention is not at an initial state 60.

When the numerical key is depressed, the signal corresponding to the depressed numerical key is generated. The controller 11 receives the signal generated by the numerical key. In response to the generated signal, the initial state 60 transits to the entry state 61 via the path 80. As a result, the controller 11 increases the value stored in the display counter 13c by one. More specifically, the controller 11 recalls the value stored in the display counter 13c, increases the value stored in the display counter 13c by one, and stores the increased value in the display counter 13c. In response to such transition, the controller 11 outputs the signal generated by the numerical key to the display device 2. A numerical character corresponding to the numerical key is displayed on the numerical section of the display device 2 based on the signal generated by the numerical key. The value stored in the display counter 13c is displayed on the counter section of the display device 2.

When the numerical key is depressed, the controller 11 receives the signal generated by the numerical key as described above. In response to the generated signal, the entry state 61 transits to the entry state 61 via a path 81. As a result, the controller 11 outputs the signal generated by the numerical key to the display device 2. The numerical character corresponding to the numerical key is displayed on the numerical section of the display device 2 based on the signal. Since the display counter 13c maintains the value stored therein, the value displayed in the counter section of the display device 2 remains unchanged.

When the key [tax] is depressed, a signal corresponding to the key [tax] is generated. The controller 11 receives the signal generated by the key [tax]. In response to the generated signal, the entry state 61 transits to a tax inclusion state 67 via a path 100. As a result, the controller 11 calculates the amount including tax and the amount of tax with respect to the numeral unit input through the numerical key. Specifically, in order to obtain the amount including tax, the controller 11 multiplies the numeral unit input through the numerical key by 1.03. Next, in order to obtain the amount of tax, the controller 11 multiplies the numeral unit input through the numerical key by 0.03. The controller 11 stores the result of the calculation. Next, the controller 11 stores 1 in the display counter 13c. The display device 2 displays the value obtained by multiplying the numeral unit by 1.03 and displays the value stored in the display counter 13c.

Then, when the key [tax] is depressed again, the tax inclusion state 67 transits to a tax state 68 via a path 101 in response to the signal corresponding to the key [tax]. As a result, the controller 11 stores 1 in the display counter 13c. The display device 2 displays the value previously obtained by multiplying the numeral unit by 0.03 and displays the value stored in the display counter 13c.

Subsequently, when the key [tax] is depressed again, the tax state 68 transits to the tax included state 67 via a path 102 in response to the signal corresponding to the key [tax]. As a result, the controller 11 stores 1 in the display counter 13c. The display device 2 displays the value previously obtained by multiplying the numeral unit by 1.03 and displays the value stored in the display counter 13c. Instead of storing 1 in the display counter 13, the display counter 13c may maintain the previous value.

In the case where the RAM 13 of Example 4 includes the X register 13a, the Y register 13b, and the internal counter 13d, the electronic desk calculator of Example 4 operates in the same way as that in Example 2.

By successively depressing the key [tax], the amount of tax and the amount including tax can be displayed on the numerical section of the display device 2 in an alternate manner.

Figure 29:
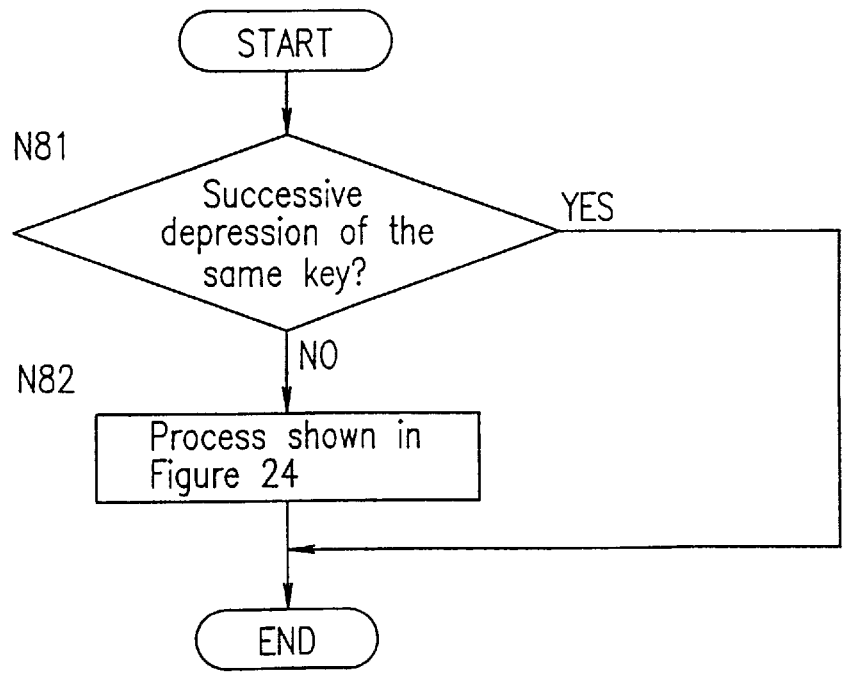
FIG. 29 is an exemplary flow chart of the electronic desk calculator according to the present invention.

FIG. 29 is a flow chart showing an example of the operation of the counter in the case where the same key such as the key [tax] is successively depressed.

At Step N81, the controller 11 determines whether or not the key [tax] is depressed. In the case where the controller 11 determines the depression of the key [tax], this process is ended. If not, the process proceeds to Step N82.

At Step N82, Steps shown in FIG. 24 (Steps N31 to N33) and described below are performed. Thereafter, the process is ended.

Although not shown in the figure, Step N80 for clearing the display counter 13c and increasing the value stored in the display counter 13c by one may be added prior to Step N81. Step N80 may be executed immediately after the completion of a calculation of a certain expression.

EXAMPLE 5

The electronic desk calculator 1 of Example 5 according to the present Invention includes the display device 2, the keyboard 3, the controller 11, the ROM 12 and the RAM 13.

The display device 2 displays a numeral unit, the result of the operation and a value stored in the display counter 13c. The display device 2 may be a liquid crystal display device.

The keyboard 3 includes a numerical key for inputting a numeral unit, a decimal point key, an operator key, and calculation result keys such as [=], [M+] and [M−], and a sub-numerical key [RM] for recalling the value stored in the memory.

When a particular key on the keyboard 3 is depressed, a signal corresponding to the particular key is output to the controller 11. The controller 11 receives a signal from the keyboard 3, and determines which key on the keyboard 3 is depressed. The controller 11 performs a calculation process including arithmetical operations, a count process for the display counter 13c and the internal counter 13d, a comparison process upon verification, and a display process of the result of the calculation.

The ROM 12 stores a program for performing the above-mentioned process, a program for generating computer graphics, or the like.

The RAM 13 includes the X register 13a, the Y register 13b, the operator register 13f, the display counter 13c, the internal counter 13d, the memory counter 13e, and a work area 131 required for other works.

An example of the operation of the electronic desk calculator in Example 5 will be described with reference to FIG. 15. FIG. 15 shows the relationship between the transition of a display screen of the display device 2 of Example 5 and the transition of the values stored in the internal counter 13d and the memory counter 13e.

A display screen S61 shows an initial screen of the display device 2. In this case, 00 is displayed on the counter section, while 0 is displayed on the numerical section. The display counter 13c and the memory counter 13e respectively store 0.

A display screen S62 shown the screen after the input of the numeral unit 2. When the numeral unit 2 is input, 01 is displayed on the counter section, while 2 is displayed on the numerical section. The display counter 13c stores 1, while the memory counter 13e maintains 0.

A display screen S63 shows the screen after an operator [×] is input. In this case, the values displayed on the numerical section and the counter section remain unchanged. The display counter 13c and the memory counter 13e maintain the stored values.

A display screen S64 shows the screen after a numeral unit 3 is input. In this case, the counter value 02 is displayed on the counter section, while the numerical value 3 is displayed on the numerical section. The display counter 13c stores 2, while the memory counter 13e maintains 0.

A display screen S65 shows a screen in the case where the calculation result key [M+] is depressed. In this case, the counter value 02 is displayed on the counter section, while the result of the calculation 2×3, that is, 6 is displayed on the numerical section. The display device 2 also displays on operator M indicating that the numerical value is stored in the memory. The value 2 is maintained on the display counter 13c. The memory counter 13c stores the value stored in the display counter 13c, that is, 2.

A display screen S66 shows a screen in the case where a sub-numerical key [RM] is depressed. In this case, the value stored in the memory cell is displayed on the numerical section. The display device 3 also displays the symbol "M" indicating that a numerical value is stored in the memory.

The display counter 13c stores the value stored in the memory counter 13e, that is, 2. The memory counter 13e maintains 2.

A display screen S67 shows a screen in the case where the key [×] is depressed as an operator. In this case, the values displayed in the numerical section and the counter section remain unchanged. The display device 2 also displays the symbol "M". The display counter 13c and the memory counter 13e maintain the stored values.

A display screen S68 shows the screen after the numeral unit 3 is input. In this case, the counter value 03 is displayed on the counter option, while the numerical value 3 is displayed on the numerical section. The display device 2 also displays the symbol "M". The display counter 13c stores 3, while the memory counter 13e maintains 2.

A display screen S69 shows the screen after the calculation result key [–] is input. In this case, the values displayed in the numerical section and the counter section remain unchanged. The display device 2 also displays the symbol "M". The display counter 13c and the memory counter 13 maintain the stored values. The result of the calculation of 6×3, that is, 18 is displayed on the numerical section, while the value stored in the display counter 13c is displayed on the counter section.

A display screen S70 shows the screen after the sub-numerical key [RM] is depressed. In this case, the value stored in the memory-cell, that is, 6 is displayed on the numerical section. The display device 2 displays the symbol "M".

The display counter 13c stores the value stored in the memory counter 13e, that is, 2. The value stored in the display counter 13c is displayed in the numerical section. The memory counter 13e maintains 2.

A display screen S71 shows the screen in the case where part of the numeral unit 2 is input. The display counter 13c stores 1, while the memory counter 13e maintains 2. Part of the numeral unit, 2, is displayed on the numerical section, while 01 is displayed on the display counter 13c.

Figure 16:
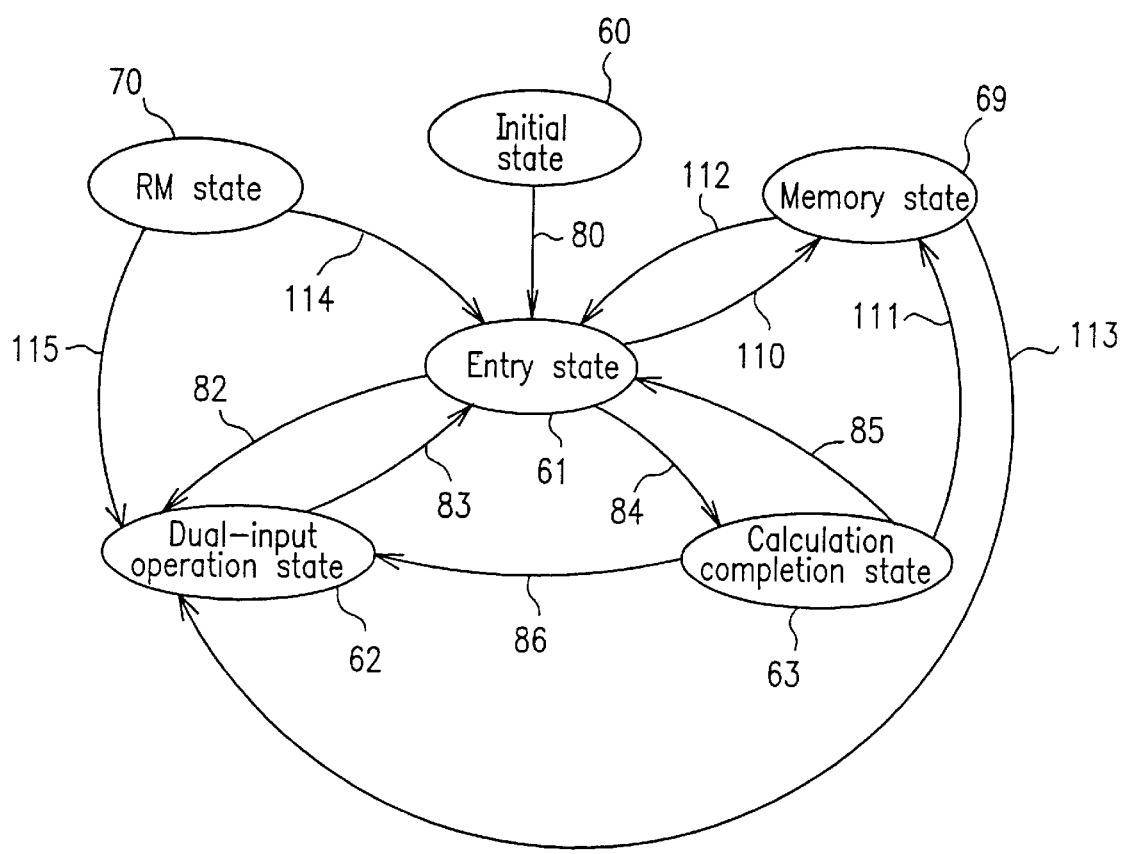
FIG. 16 is an exemplary state transition view in Example 5 according to the present invention.

The operation of the electronic desk calculator including the case where the calculation result keys [M+] and [M–] and the sub-numerical key [RM] are depressed will be described with reference to FIG. 16. Since the some states and paths as those shown in FIG. 10 are denoted by the same reference numerals in FIG. 15, the description thereof is basically herein omitted.

When the calculation result key [M+] or [M–] is depressed, the signal corresponding to the calculation result key [M+] or [M–] is generated. The controller 11 receives the signal generated by the calculation result key [M+] or [M–]. In response to the generated signal, the entry state 61 transits to the memory state 69 via the path 110, and the calculation completion state 63 transits to the memory state 69 via the path 111. As a result, the controller 11 stores the value stored in the X register 13a and the value stored in the display counter 13c in a work area.

When the sub-numerical key [RM] is depressed, a signal corresponding to the sub-numerical key [RM] is generated. The controller 11 receives the signal generated by the sub-numerical key [RM]. in response to the generated signal, each state transits to the RM state 70. As a result, the controller 11 stores the values previously stored in a work area in the X register 13a and the display counter 13c.

If the numerical key is depressed, a signal corresponding to the numerical key is generated. The controller 11 receives the signal generated by the numerical key. In response to the generated signal, the memory state 69 transits to the entry state 61 via a path 112, and the RM state 70 transits to the entry state 61 via a path 114, respectively. The controller 11 stores the numerical value corresponding to the numerical key in the X register 133, clears the display counter 13c to zero, and increases the value stored in the display counter 13c.

If the operator key is depressed, a signal corresponding to the operator key is generated. The controller 11 receives the signal generated by the operator key. In response to the generated signal, the memory state 69 transits to the dual-input operation state 62 via a path 113, and the RM state 70 transits to the dual-input operation state 62 via a path 115. The controller 11 stores the value corresponding to the numerical key in the X register 13a, clears the display counter 13c to 0, and increases the value stored in the display counter 13c by one. The controller 11 stores the operator corresponding to the operator key in the operator register. The X register 13a, the Y register 13b and the display register maintain the previously stored values, respectively.

Figure 22:
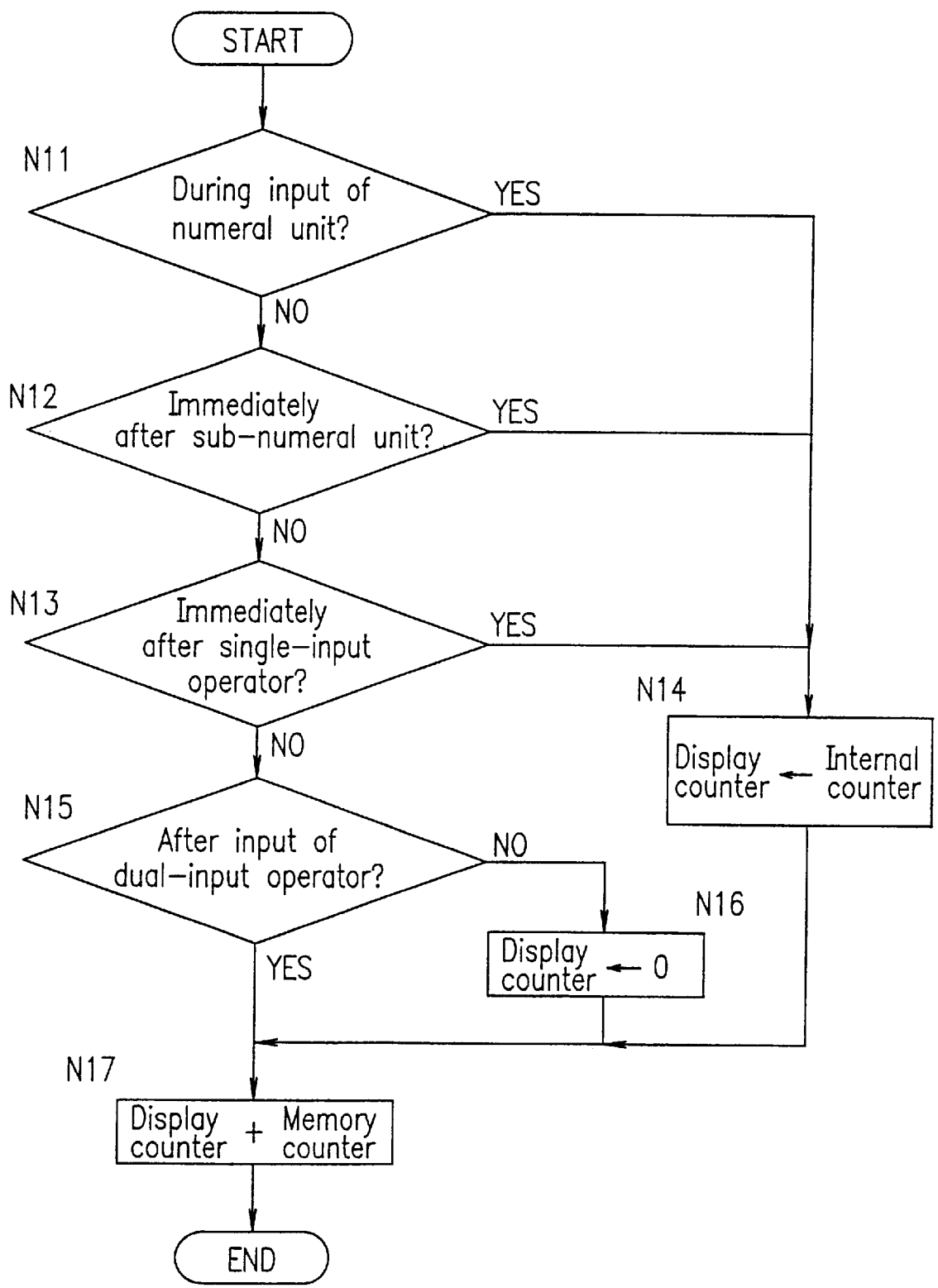
FIG. 22 is an exemplary flow chart of the electronic desk calculator according to the present invention.

FIG. 22 is a flow chart showing an example of the operation of the counter in the case where the sub-numerical key [RM] is depressed, followed by the depression of at least one of the numeral keys [0] to [9 ]and [.].

At Step N11, the controller 11 determines whether or not any numerical key or other key is depressed immediately before the depression of the numerical key. In the case where any numerical key is depressed immediately before the depression of the numerical key, the process proceeds to Step N14. If not, the process proceeds to Step N12.

Since Steps N12 through N16 are the same as Steps N2 through N6 shown in FIG. 21, the description thereof is basically herein omitted.

At Step N17, the controller 11 includes the number of calculations performed for the memory in the number of calculation currently performed. Therefore, the controller 11 adds the value stored in the display counter 13c to the value stored in the internal counter 13d, and then stores the sum in the display counter 13c.

Figure 27:
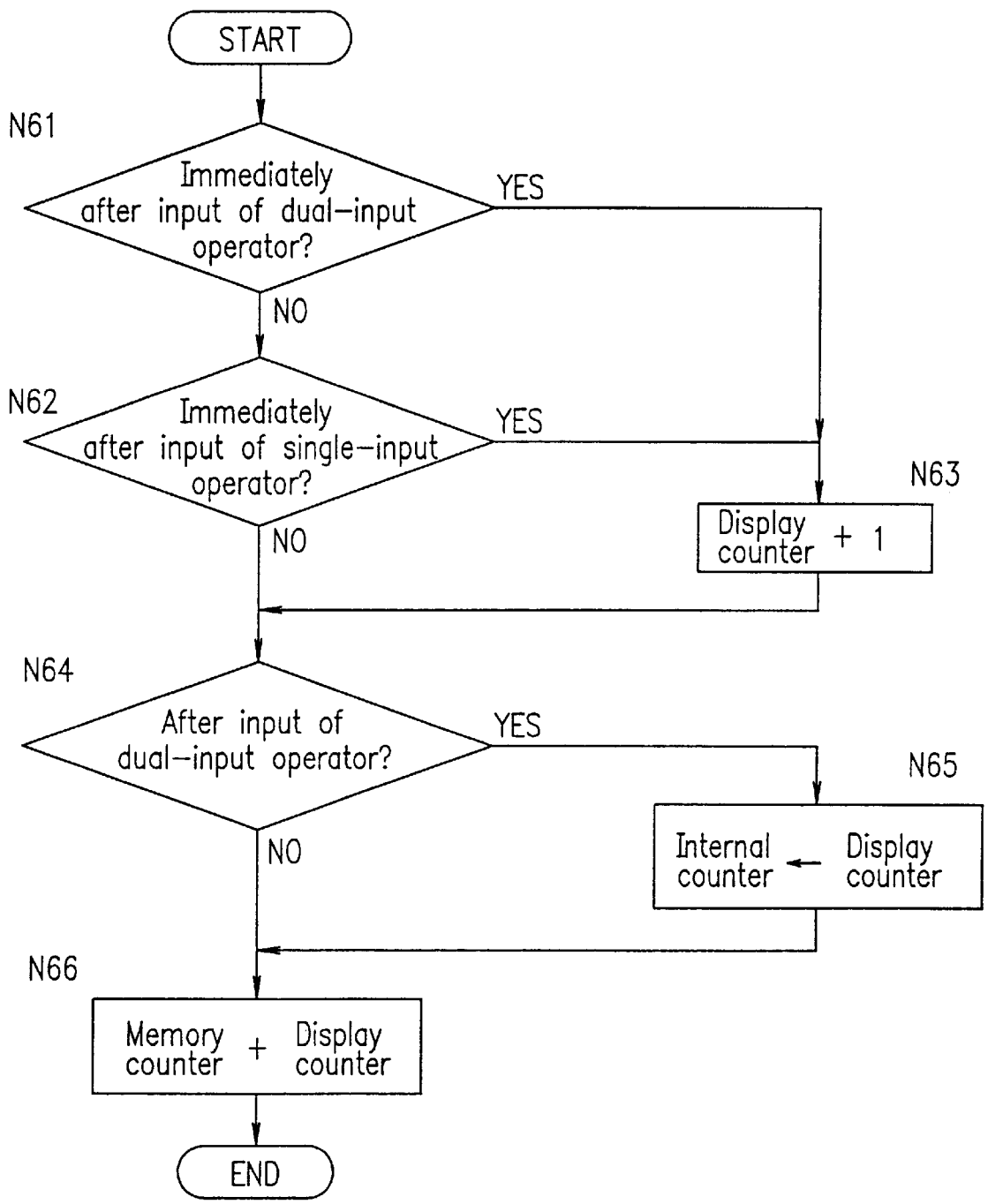
FIG. 27 is an exemplary flow chart of the electronic desk calculator according to the present invention.

FIG. 27 is a flow chart showing an example of the counter in the case where a memory key such as [M+] or [M−] is depressed.

At Step N61, the controller 11 determines whether or not the dual-input operator key is depressed immediately before the depression of the memory key. In the case where the dual-input operator key is depressed immediately before the depression of the memory key, the process proceeds to Step N63. If not, the process proceeds to Step N64. For example, the come where the dual-input operator key in depressed immediately before the depression of the memory key includes the case where keys [2], [×] and [M+] are successively input in this order.

At Step N62, the controller 11 determines whether or not any single-input operator key is depressed immediately before the depression of the memory key. In the case where any single-input operator key is depressed immediately before the depression of the memory key, the process proceeds to Step N63. If not, the process proceeds to Step N64. For example, the case where the single-input operator key is depressed immediately before the depression of the memory key includes the case where keys [2], [√] and [M+] are successively input in this order.

At Step N63, the controller 11 increases the value stored in the display counter 13c by one. Then, the process proceeds to Step N64.

At Step S64, the controller 11 determines whether or not any operator has been already input. In the case where any operator has been already input, the process proceeds to Step N65. If not, the process proceeds to Step N66.

At Step N65, the controller 11 stores the value of the display counter 13c in the internal counter 13d.

At Step N66, the controller 11 adds the value stored in the memory counter 13e to the value stored in the display counter 13c, and then stores the sum in the display counter 13c.

Although not shown in the figure, Step N60 may be executed after the completion of a calculation of a certain expression. Step N60 for clearing the display counter 13c and increasing the value stored in the display counter 13c by one may be added prior to Step N61.

EXAMPLE 6

The electronic desk calculator 1 of Example 6 according to the present invention includes the display device 2, the keyboard 3, the controller 11, the ROM 12 and the RAM 13. Since the configuration of the display device 2, the keyboard 3, the ROM 12 end the RAM 13 ore the same as those in Example 2 the description thereof is basically herein omitted.

Figure 17:
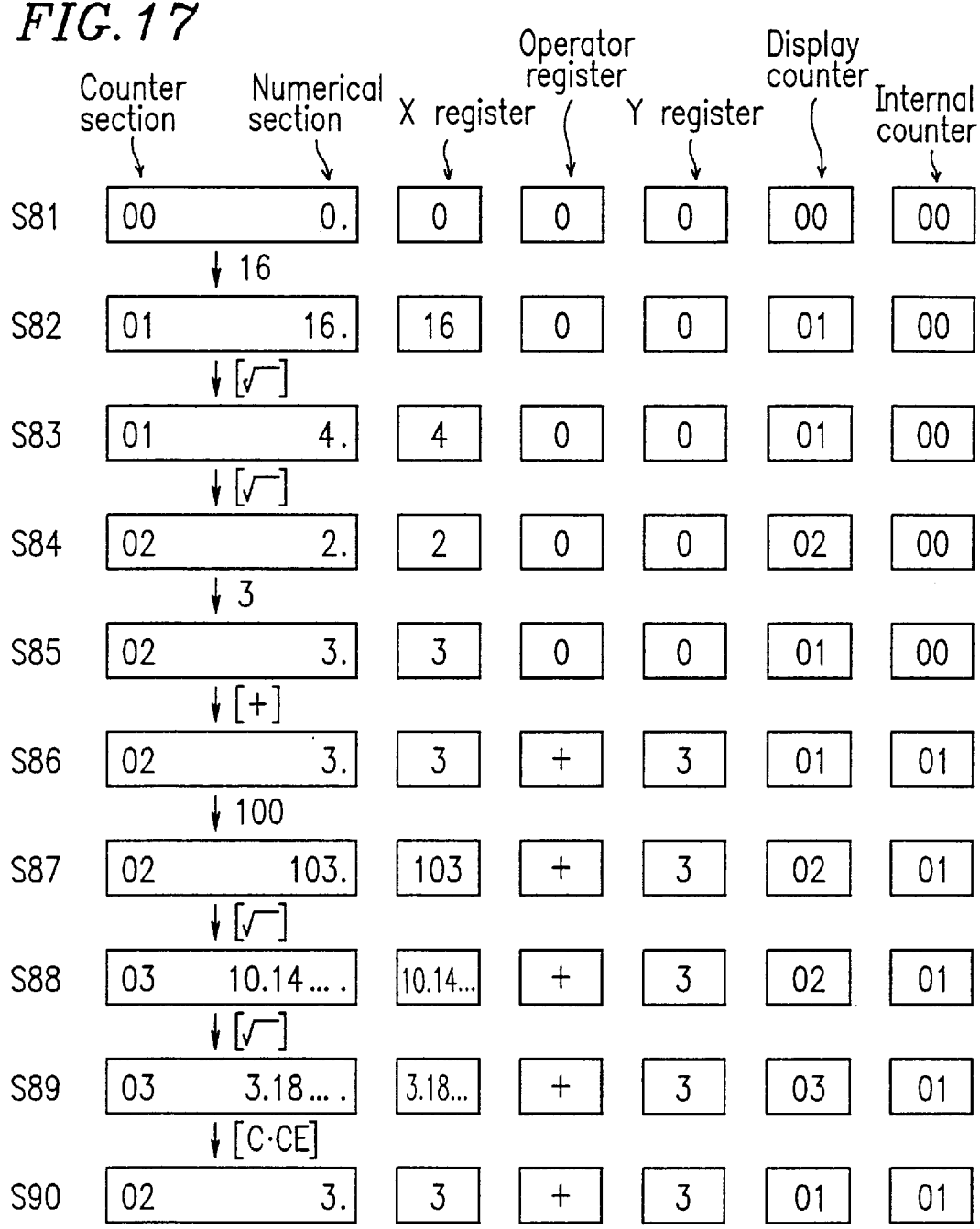
FIG. 17 is an exemplary display screen in Example 6 according to the present invention.

An example of the operation of the electronic desk calculator of Example 6 will be described with reference to FIG. 17. FIG. 17 shows the relationship between the transition of a display screen of the display device 2 in Example 6 and the transition of the values stored in the X register 13a, the Y register 13b, the display counter 13c, the internal counter 13d, and the operator register 13f.

A display screen S81 shows en Initial screen of the display device 2. In this case, the values stored in the X register 13a, the operator register 13f, the Y register 13b, the display counter 13a and the internal counter 13d are respectively 0. The values stored in the operator register 13f and the Y register 13b may be arbitrary values.

A display screen S82 shows a screen after a numeral unit 16 is input. When the numeral unit 16 is input, the counter value 01 is displayed on the counter section, while the numerical value 16 is displayed on the numerical section. The X register 13 stores 16, while the display counter 13c stores 1. The operator register 13f, the Y register 13b and the internal counter 13d maintain the previous values, that is, 0.

A display screen S83 shows a screen in the case where an operator [√√] is input as an operator in this case, the X register 13a stores the square root of 16, that is, 4, and 4 is displayed on the numerical section. The value displayed in the counter section remains unchanged. The operator register 13f, the Y register 13b and the internal counter 13d maintain the previous values, that is, 0.

A display screen S84 shows a screen in the case whore an operator [√] is input as an operator. In this case, the X register 13a stores the square root of 4, that is, 2, while 2 is displayed on the display screen. The counter value 2 is displayed on the counter section. The operator register 13f, the Y register 13b and the internal counter 13d maintain the previous values, that is, 0.

A display screen S85 shows the screen after a numeral unit 3 is input. When the numeral unit 3 is input, the counter value 01 is displayed on the counter section, while the numerical value 3 is displayed on the numerical section. The X register 13a stores 3, while the display counter 13c stores 1. The operator register 13f, the Y register 13b and the internal counter 13d maintain the previous values, that is, 0.

A display screen S86 shows the screen after an operator [+] is input as an operator. In this case, the values displayed on the numerical section and the counter section remain unchanged. The Y register 13b stores the value stored in the X register 13a, while the X register 13a maintains 3. The operator register stores the operator corresponding to an operator key [+], The internal register stores 1.

A display screen S87 shows the screen after a numeral unit 100 is input. In this case, the display counter 13c stores 2, while 02 is displayed on the counter section. The X register 13a stores 103, while 103 is displayed on the numerical section. The operator register 13f, the Y register 13b and the internal counter 13d maintain the previous values.

A display screen S68 shows the screen in the case where [√] is input as an operator. In this case, the X register 13e stores the square root of 103, i.e., 10.14 . . . , and the display screen therefore displays 10.14 . . . The value displayed in the counter section remains unchanged. The operator register 13f, the Y register 13b, and the internal counter 13d maintain the previous values.

A display screen S89 shows the screen after an operator [√] is input as an operator. In this case, the X register 13a stores the square root of 10.14 . . . , i.e., 3.18 . . . , and the display screen therefore displays 3.18 . . . The display counter 13c stores 3, while 3 is displayed on the counter section. The operator register 13f, the Y register 13b and the internal counter 13d maintain the previous values.

A display screen S90 shows the screen in the case where a clear key [C·CE] is depressed. The X register 13a stores 3 which is stored in the Y register 13b, and 3 is displayed on the numerical section. The display counter 13c stores 1, while 01 is displayed on the counter section. the Y register 13b and the internal register maintain the previous values.

Figure 18:
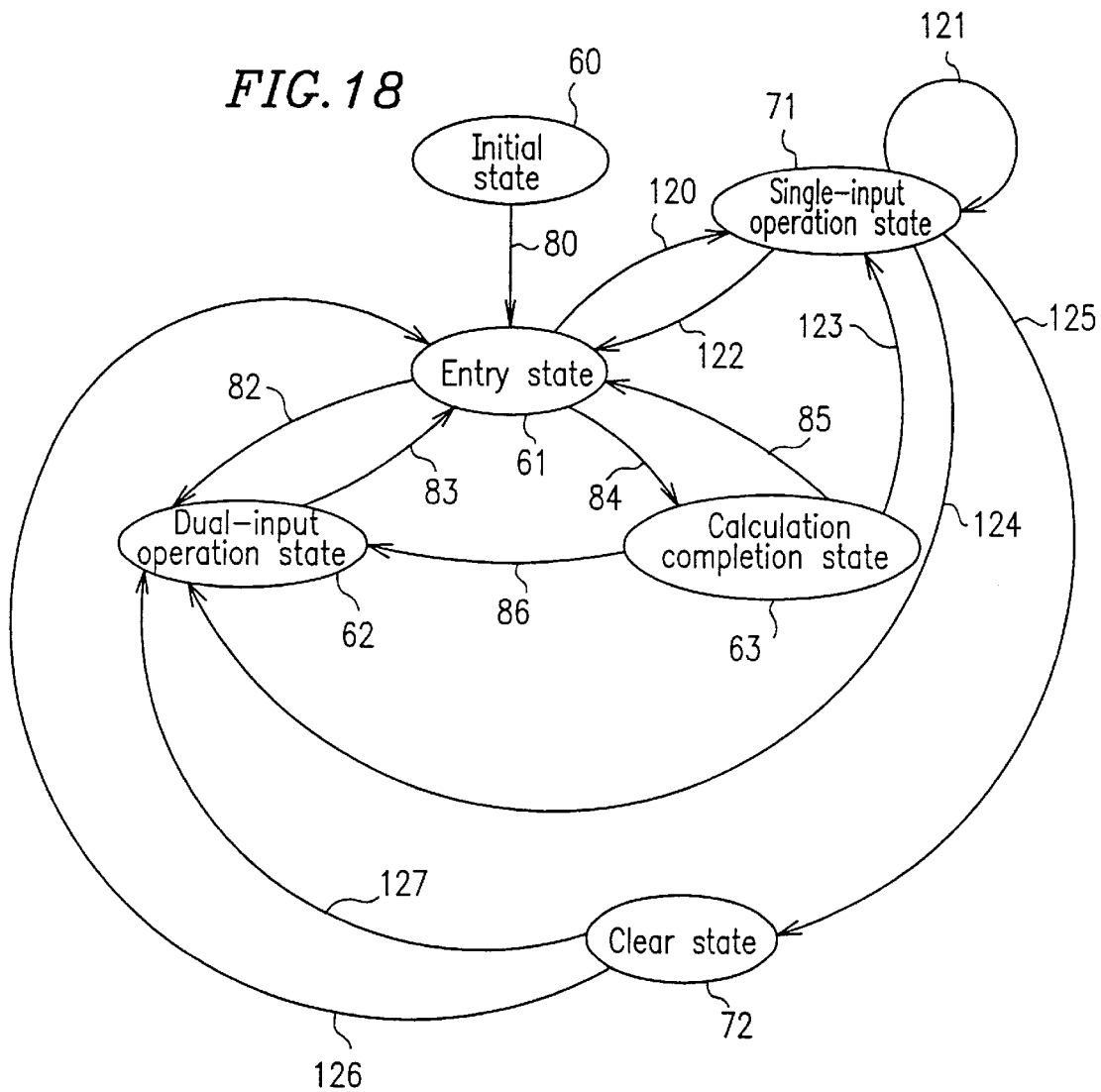
FIG. 18 is an exemplary state transition view in Example 6 according to the present invention.

The operation of the electronic desk calculator including the case where a single-input operator key is depressed will be described with reference to FIG. 18. Since the same states and paths as those shown in FIG. 10 are denoted by the same reference numeral in FIG. 18, the description thereof is basically herein omitted.

When the single-input operator key [√] is depressed, a signal corresponding to the single-input operator key [√] is generated. The controller 11 receives the signal generated by the single-input operator key [√]. In response to the generated signal, the entry state 61 transits to a single-input operation state 71 via a path 120, and the calculation completion state 63 transits to the single-input operation state 74 via a path 123. As a result, the controller 11 calculates the square root of the value stored in the X register 13a, and stores the result of operation in the X register 13a. The display register, the operation register 13f, the Y register 13b and the internal counter 13d maintain the values prior to the transition of the state.

When the single-input operator key [√] is depressed, in response to the signal generated by the single-input operator key [√], the single-input operation state 71 transits to the single-input operation state 71 via a path 121. As a result, the controller 11 calculates the square root of the value stored in the X register 13a, and stores the result of the operation in the X register 13a. The controller 11 increases the value stored in the display counter 13c by one. The display device 2 displays the values stored in the X register 13a and the display counter 13c. The operator register 13f, the Y register 13b and the internal counter 13d maintain the values prior to the transition of the state.

When the clear key [C·CE] is depressed, a signal corresponding to the clear key [C·CE] is generated. The controller 11 receives the signal generated by the clear key [C·CE]. In response to the generated signal, the single-input operation state 71 transits to a clear state 72 via a path 125. As a result, the controller 11 stores the value stored in the Y register 13b in the X register 13a. The controller 11 clears the display counter 13c to 0, and increases the value stored in the display counter 13c by one. The operation register 13f and the internal counter 13d maintain the values prior to the transition of the state.

When the numerical key is depressed, a signal corresponding to the numerical key is generated. In response to the generated signal, the single-input operation state 71 transits to the entry state 61 via a path 122, and the clear state 72 transits to the entry state 61 via a path 126. The controller 11 stores the numerical value corresponding to the numerical key in the X register 13a, clears the display counter 13a to 0, and increases the value stored in the display counter 13c by one. The operator register 13f, the Y register 13b and the Internal counter 13d maintain the values prior to the transition of the state.

When the operator key is depressed, a signal corresponding to the operator key is generated. The controller 11 receives the signal generated by the operator key. In response to the generated signal, the single-input operation state 71 transits to the dual-input operation state 62 via a path 124, and the clear state 72 transits to the dual-input operation state 62 via a path 127. The controller 11 stores the numerical value corresponding to the numerical key in the X register 13a, clears the display counter 13c to 0, and increases the value stored in the display counter 13c by one. The controller 11 stores the operator corresponding to the operator key in the operator register. The X register 13, the Y register 13b, the display register 13c, and the internal register 13d maintain the stored values, respectively.

Figure 24:
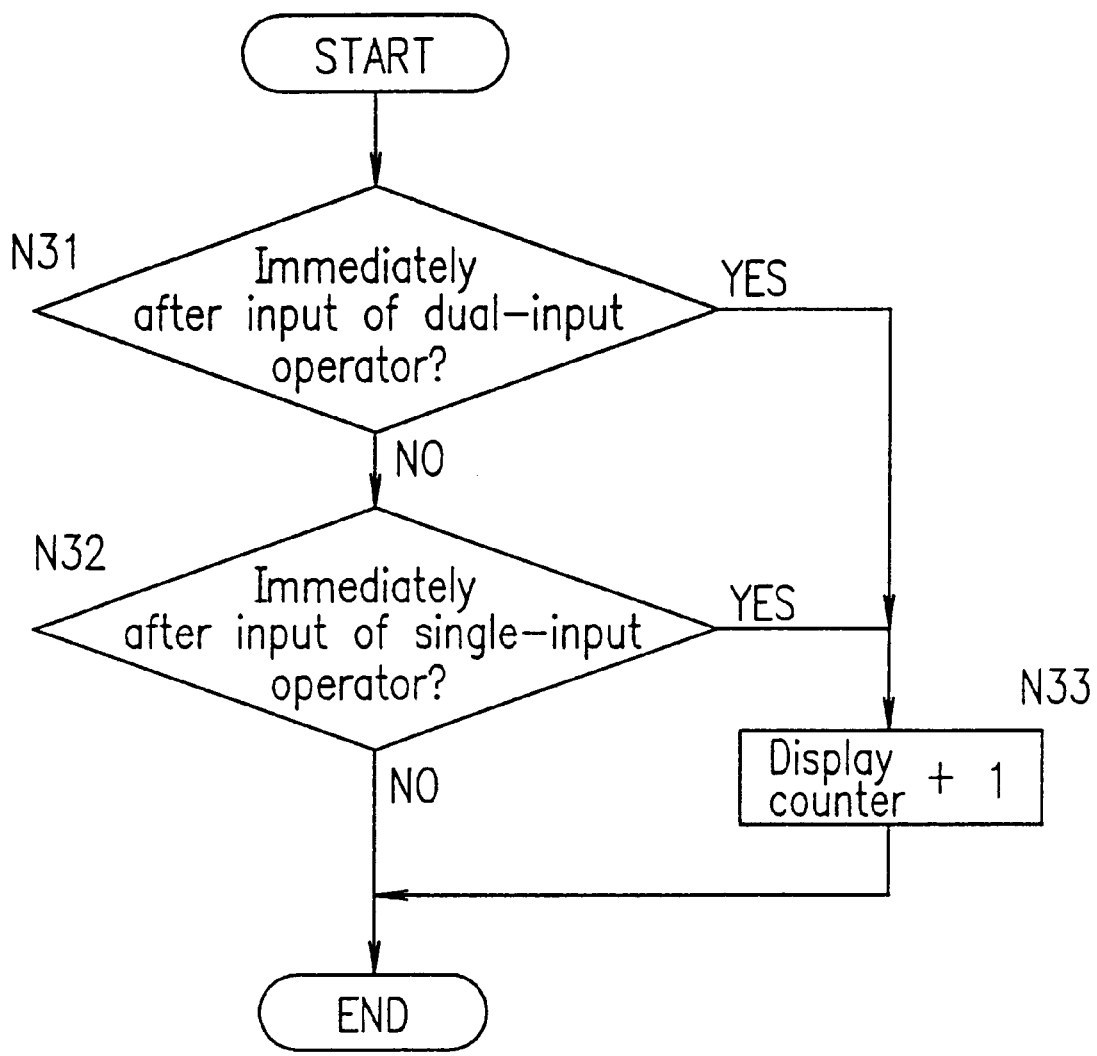
FIG. 24 is an exemplary flow chart of the electronic desk calculator according to the present invention.

FIG. 24 is a flow chart showing an example of the operation of a counter in the case where the single-input operator key such as [√] is depressed.

At Step N31, the controller 11 determines whether or not any dual-input operator key is depressed immediately before the depression to the single-input operator key. In the case where any dual-input operator key is depressed immediately before the depression of the single-input operator key, the process proceeds to Step N33. If not, the process proceeds to Step N32. For example, the case where any dual-input operator key is depressed immediately before the depression of the single operator key includes the case where keys [+] and [√] are successively depressed.

At Step N32, the controller 11 determines whether or not any single-input operator key or other key is depressed immediately before the depression of the single-input operator key in the case where any single-input operator key is depressed immediately before the depression of the single-input operator key, the process proceeds to Step N33. If not, the process is ended. For example, the case where another single-input operator key or other key is depressed immediately before the depression of the single-input operator key includes the case where keys [√] and [√] are successively depressed.

At Step N33, the controller 11 increases the value in the display counter 13c by one.

After the completion of a calculation of a certain calculation, Step 30 (not shown) may be executed. Step N30 for clearing the display counter 13c and the value stored in the display counter 13c by one may be added prior to Step N31.

Examples 1 to 6 described above may have the following functions. FIG. 19 shows the transition of the state of a display screen of the electronic desk calculator according to the present invention.

A display screen S101 shows an initial screen. The numerical value 0 is displayed on the numerical section, while the counter value 00 is displayed on the counter section. The symbols described below are not lighted.

A display screen S102 shown the screen after a numeral unit 123 is input. Also in this cases, the symbols are not lighted.

A display screen S103 shows the screen after an operator key [+] is depressed. In this case, the symbol indicating the operator key has been depressed just before is lighted. If an arbitrary key other than the operator key is subsequently depressed, the lighted symbol is put out.

A display screen S104 shows the screen after a head 4 of the numeral unit is input. The symbol is put out. As a result, it can be seen that a numeral unit is now being input.

A display screen S105 shows the screen after the remaining portion 56 of the numeral unit and the operator [=] are input. The symbol remains unlighted.

Since the symbol is lighted if the operator key is depressed in this manner, a user can see whether or not the operator key is depressed.

Figure 20:
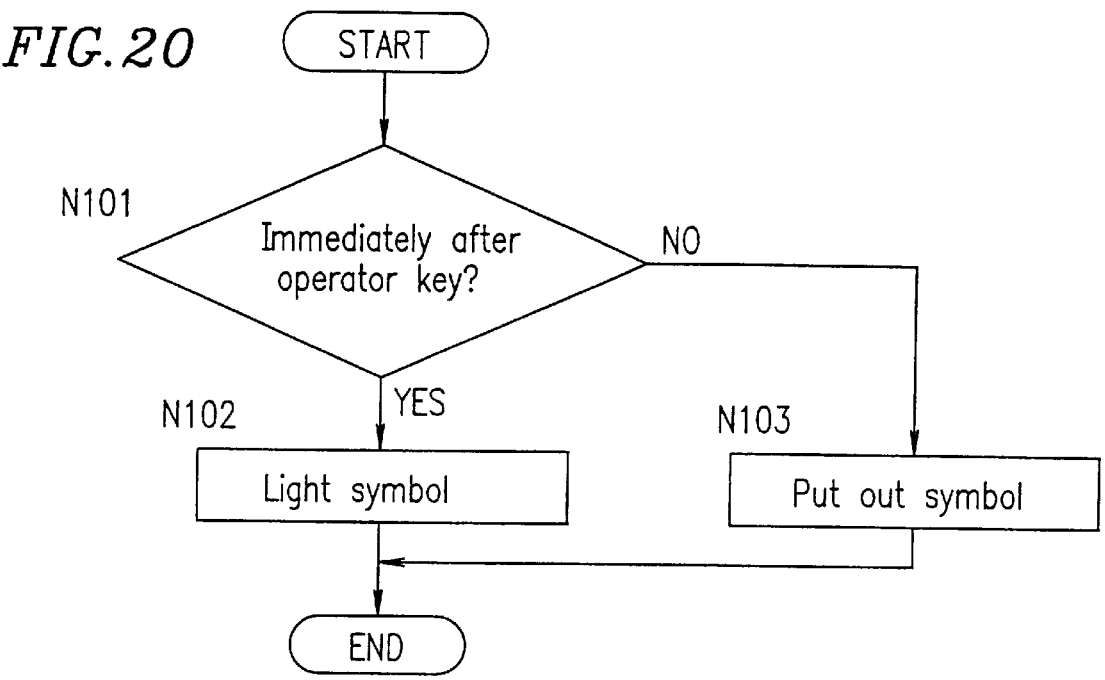
FIG. 20 is an exemplary flow chart of the electronic desk calculator according to the present invention.

FIG. 20 is a flow chart for controlling ON and OFF state of the symbol indicating whether or not the operator key has been depressed immediately before.

At Step N101, the controller 11 determines whether or not the operator key has been depressed immediately before based on a status flag 13g. In the case where the statue flag 13g is on, the process proceeds to Step N102. If not, tho process proceeds to Step N103.

At Step N102, the controller 11 allows the display device 2 to light the symbol indicating that the operator key has been depressed immediately before.

At Step N103, the controller 11 allows the display device 2 to put out the symbol indicating that the operator key has bean depressed immediately before.

EXAMPLE 7

The electronic desk calculator 1 of Example 7 according to the present invention includes the display device 2, the keyboard 3, a switch 4, the controller 11, the ROM 12 and the RAM 13.

The display device 2 displays a numeral unit, the result of the operation, the value in the display counter 13c, and at least one of a symbol for verification indicating that the verified result is correct and a state display symbol indicating the electronic desk calculator such as a verification state and an accumulation calculation state. The display service 2 may be a liquid crystal display device.

The keyboard 3 includes a numerical key for inputting a numeral unit, a decimal point key, an operator key, and calculation result keys such an [=], [M+] and [M−], and a key [PRE] used for displaying the contents of a verification register. The electronic desk calculator according to the present invention may include a key [GT/PRE] used for both verification and accumulation calculation instead of the key [PRE].

In the case where the electronic desk calculator of the present invention includes a verification function, the switch 4 includes a selection switch for selecting whether the verification function is to be used or not, a TAB switch for specifying the position of the result of a calculation to be rounded, a round switch for selecting a method for rounding the result of a calculation, for example, rounding up, rounding down and rounding to the nearest whole number, and a power switch. In the case where the electronic desk calculator according to the present invention includes a verification function and an accumulation calculation function, the electronic desk calculator may include a section swatch allowing the use of at least one of the verification function and the accumulation calculation function.

If any one key on the keyboard 3 is depressed, a signal corresponding to the depressed key is output to the controller 11.

The controller 11 receives a signal from the keyboard 3 so as to determine which key on the keyboard 3 is depressed. The controller 11 performs a calculation process including arithmetic operations, a counting process of the counter, a comparison process upon verification and a display process of the result.

The ROM 12 stores a program for performing the above-mentioned process, a program for generating computer graphics, or the like.

The RAM 13 includes a register, a counter, a flag and a work area required for other operations.

The RAM 3 of the electronic desk calculator of Example 7 includes the X register 13a, the Y register 13b, the operator register 13f, and an accumulation calculation/verification register 13h as registers. The X register 13a stores the value of a numeral unit and the value of the result of the operation. The value stored in the X register 13a is displayed on the display device 2.

The RAM 13 of the electronic desk calculator of Example 7 includes a status flag 13g, a verification flag 13i, a post-verification flag 13j.

The status flag 13g stores the following states. The value stored in the status flag 13g indicates a state where a numeral unit is input, a state where the operation key has not been depressed yet, i.e., a pre-calculation state, or a state where the calculation is performed by depressing the operator key or the like, i.e., a post-calculation state. The status flag 13g may be used for controlling an ON and OFF light for a symbol.

The verification flag 13i stores the value indicating whether or not a comparison value for verification is stored in the accumulation calculation/verification register 13h. The verification flag 13i stores the value indicating which of the comparison value required for verification or the value in the course of accumulation calculation as a memory calculation is stored.

The RAM 13 of the electronic desk calculator of Example 7 includes the display counter 13c, the internal counter 13d, the memory counter 13e, and the verification counter as counters.

An example of the operation of the electronic desk calculator of the present invention will be described with reference to FIG. 30.

A display screen S201 shows an initial screen. The numerical value 0 is displayed on the numerical section, while the counter value 00 is displayed on the counter section.

As shown in a display screen S202, the display device 2 displays the result of a calculation: 1[+]2[+]3[=], that is, 6, in the case where the switch is adjusted to a position of V which is, for example, described in the body of the present invention, so as to select a verification mode. Since a value to be compared is not stored in the accumulation calculation/verification register 13h, the symbol "V" displayed on the display device 2 is not lighted. Thereafter, the calculated result is stored in the accumulation calculation/verification register 13h.

As shown in a display screen S203, the display device 2 displays the result of a calculation: 1[+]2[+]3[=], that is, 6. Since the result obtained by the previous calculation (the value stored in the accumulation calculation/verification register 13h) is identical with the result obtained by the current calculation, the symbol "V" indicating that the result of the calculation is correct is lighted.

As shown in a display screen S204, the display device displays the result of a calculation: 1[+]2[+]4[=], that is, 7. The light of the symbol "V" is put out when a numerical key 1 is depressed. If any key is depressed while the symbol "V" is lighted, the symbol "V" is put out.

A display screen S205 displays the result of a calculation: 2[+]3[=], i.e., 5, in the case where the position of the switch is adjusted to the position "." as shown in FIG. 1 so as to select a non-verification mode. Since the non-verification mode is selected, the symbol "V" indicating the result is correct in not lighted.

A display screen S206 displays the result of calculation: 1[+]2[+]4[=], i.e., 7, in the case where the switch is adjusted to the position V so as to select a verification mode. Since the result of the currently performed calculation and the result of the previous calculation are identical with each other in the verification mode, the symbol "V" indicating the result of the calculation is correct is lighted.

A display screen S207 shows the result of a calculation: 35[÷][PRE] [=], i.e., 5. A key [PRE] is used to read out the result of a calculation, which is previously stored in the accumulation calculation/verification register 13h in the verification mode. By depressing the key [PRE], the result of the calculation, which is previously stored, can be obtained.

A display screen S208 shows the result of a calculation: 2[×]3[=], i.e., 6, in the case where the switch in adjusted to the position "GT" so as to select an accumulation calculation mode. The result of the calculation in added to the value stored in the accumulation calculation/verification register 13h, thereby lighting a symbol "G".

As shown in a display screen S209, the display device 2 displays the value stored in the accumulation calculation/verification register 13h by depressing a key [G] and a key [GT]. The accumulation calculation/verification register 13h stores the sum obtained in the accumulation calculation mode.

A display screen S210 shows the result of a calculation: 5[×]789 [=], i.e., 3945, in the case where the switch is adjusted to the position V so as to select a verification mode. Since the value used for verification is stored in the accumulation calculation/verification register 13h if the operation described above is executed, the symbol "G" is put out.

A display screen S211 shows the result of a calculation: 5[×]89 [=], i.e., 445. Since the value stored in the accumulation calculation/verification register 13h is not identical with the result of the current calculation, the symbol "V" is not lighted.

A display screen S212 shows the result of the calculation, which is previously stored in a verification mode. By depressing a key [PRE], the previously stored result of the calculation is displayed by the display device 2. The value displayed by the display device 2 is the value displayed on the display screen S210 but not the value displayed on the display screen S211.

By depressing the key [PRE] once more, a display screen S213 displays the value displayed on the display screen S210 again. Specifically, by successively pressing the key [PRE], the value displayed on the display screen S210 and the value displayed on the display screen S211 can be alternately displayed.

A display screen S214 shows the result of a calculation: 5[×]89[=], i.e., 445. Since the calculated value 445 and the value displayed on the display screen S211 are identical with each other, the symbol "V" indicating that the result of the current is correct is lighted.

A display screen S215 shows the result of a calculation: 123[×]4[×]5[=], that is, 2360, in the case where the position of the switch is adjusted to the position "−" as shown in FIG. 1 so as to select a non-verification mode. In this case, the result of the calculation 2460 is not stored in the accumulation calculation/verification register 13h.

A display screen S216 shows the screen when the key [PRE] is depressed.

A display screen S217 shows the result of a calculation: 123[×]4[×]5[=], that is, 2460, in the case where the switch is adjusted to the position V so as to select a verification mode. Since the result of the calculation 2460 and the value displayed on the display screen S216 are identical with each other, the symbol "V" is lighted.

As shown in a display screen S218, the display device 2 displays the result of a calculation: 123[×]20[=], i.e., 2460. Although the result of the calculation 2460 and the value displayed on the display screen S216 are identical with each other, the value of the counter shown in the screen S216 and the value of the counter shown in the screen S218 are different from each other. Therefore, the symbol "V" is not lighted. The value of the counter shown in the screen S216 is compared with a certain register.

The operation of the electronic desk calculator according to the present invention in the case where the display device 2 of the electronic desk calculator displays the display screens S201 to S218 will be described with reference to FIGS. 31 to 34. FIGS. 31 to 34 are exemplary flow charts of the electronic desk calculator according to the present invention.

Figure 31:
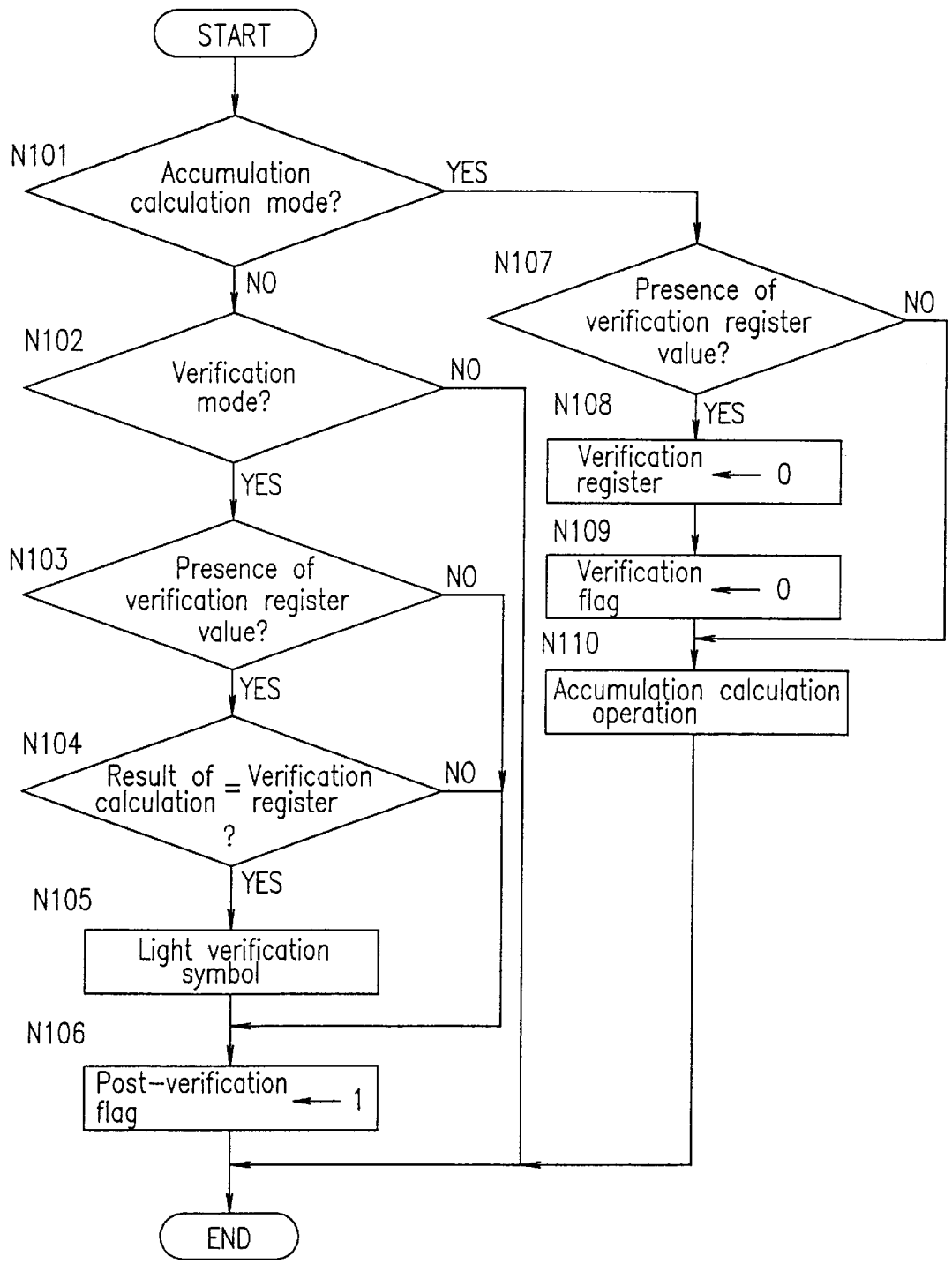
FIG. 31 is an exemplary flow chart of the electronic desk calculator in Example 7 according to the present invention.

FIG. 31 is a flow chart in the case whore the calculation result key such as [=], [%] or the like are pressed so as to obtain the result of the calculation. A process of the electronic desk calculator of the present invention differs depending on the mode such as a verification mode or an accumulation calculation mode.

At Step N101, the controller 11 determines whether the switch is at the position indicating the accumulation calculation mode. If the switch is at the position indicating the accumulation calculation mode, the process proceeds to Step N107. If not, the process 101 proceeds to Step N102.

At Step N102, the controller 11 determines whether or not the switch is at the position indicating the verification mode. In the case where the switch is at the position indicating the verification mode, the process proceeds to Step N103. If not, the process is ended.

At Step N103, the controller 11 determines whether or not the verification flag 13i is on so as to check if a comparison value required for verification is stored in the accumulation calculation/verification register 13h. If the verification flag 13i is on, the process proceeds to Step N104. If not, the process is ended. When the controller 11 stores a comparison value required for verification in the accumulation calculation/verification register 13h, a flag of the accumulation calculation/verification register 13h is on. The case where the verification flag 13i is not on includes the first calculation.

At Step N104, the controller 11 compares the result of the operation stored in the X register 13a with the result of the operation stored in the accumulation calculation/verification register 13h. In the case where the result of the operation stored in the X register 13a identical with the result of the operation stored In the accumulation calculation/verification register 13h, the process proceeds to Step N105. If not, the process proceeds to Step N105.

At Step N105, the controller 11 outputs, to the display device 2, a signal indicating that the results of the verifications are identical with each other. In response to the signal, the display device 2 allows the verification symbol "V" to be lighted.

At Step N106, when an arbitrary key is depressed subsequently, the controller 11 allows the post-verification flag 13j to be on so as to transfer the result of the calculation to the accumulation calculation/verification register 13h.

In the case where the post-verification flag 13j is not used, the controller 11 may store the result of the calculation stored in the X register 13a in the accumulation calculation/verification register 13h. The 103 controller 11 may simultaneously store the value of the display counter 13c in the verification counter 13k.

At Step N107, the controller 11 determines whether or not the accumulation calculation/verification flag 13i is on so as to check if a comparison value for verification is stored in the accumulation calculation/verification register 13h. If the accumulation calculation/verification flag 13i is on, the process proceeds to Step N108. If not, the process proceeds to Step N110.

In the case where the result of the verification stored for comparison and the result accumulated in the accumulation calculation are not stored in the same area, the process may proceed to Step S110, omitting Steps N107 to N109.

At Step N108, the controller 11 stores 0 in the accumulation calculation/verification register 13h so as to clear the value stored in the accumulation calculation/verification register 13h.

At Step N109, the controller 11 resets the accumulation calculation/verification flag 13i because a comparison value for verification is not stored in the accumulation calculation/verification register 13h.

At Step N110, the result of the calculation is accumulated in the accumulation calculation/verification register 13h. Since this accumulation operation is the same as the conventionally performed one, the description thereof is basically herein omitted.

In the case where a comparison value for verification is stored in the accumulation calculation/verification register 13h by the accumulation calculation/verification flag 13i, the controller 11 may prevent the symbol "V" from being lighted.

Figure 32:
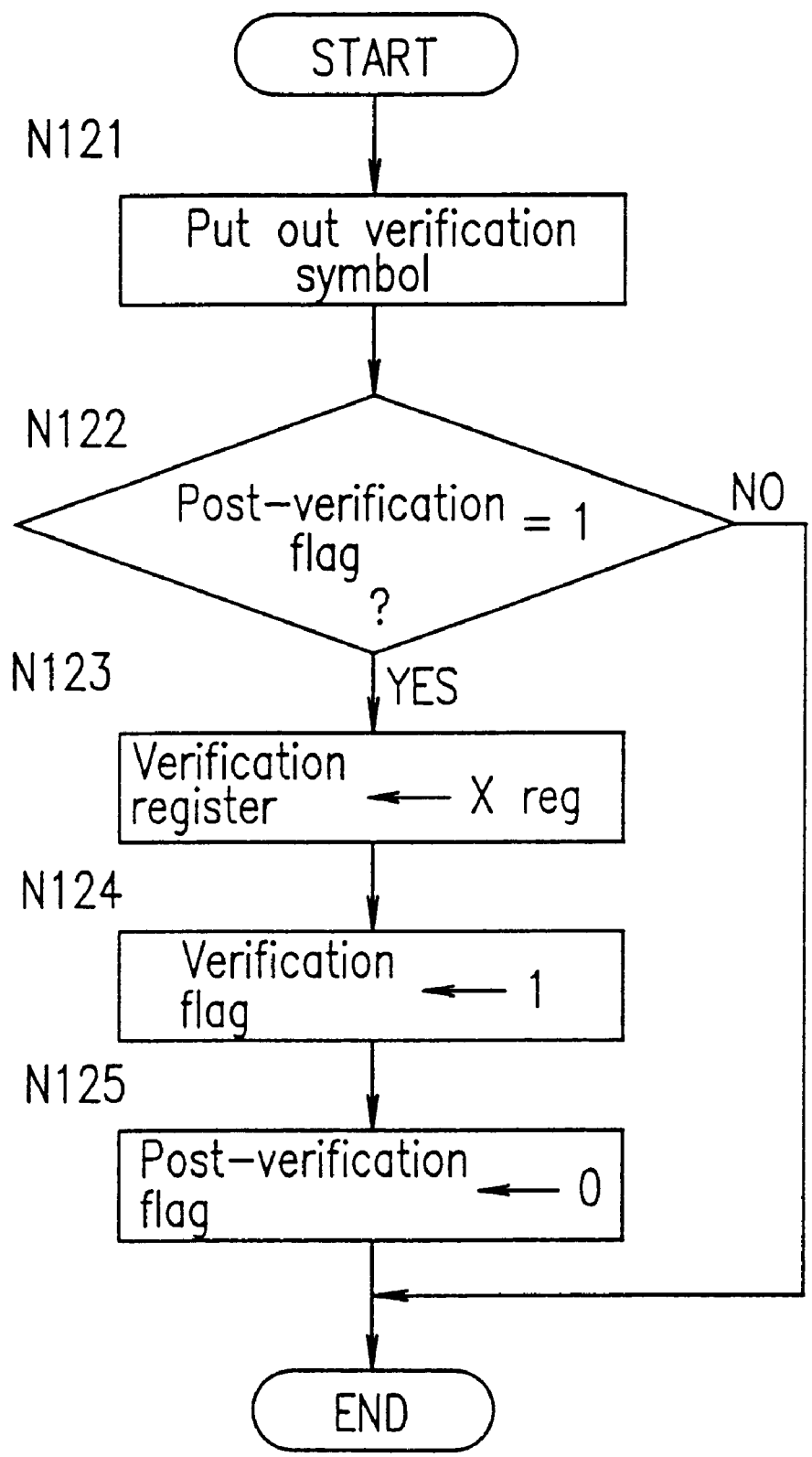
FIG. 32 is an exemplary flow chart of the electronic desk calculator according to the present invention.

FIG. 32 is a flow chart in the case where the key [PRE] (alternatively, [PRE/GT]) is depressed.

At Step N121, upon depression of an arbitrary key, the controller 11 outputs to the display device 2 the signal instructing the verification symbol "V" to be put out. In response to the signal, the display device 2 puts out the light of the verification symbol "V".

When an arbitrary key is depressed, the controller 11 erases the result of the operation stored in the accumulation calculation/verification register 13h. If the depressed key is a numerical key, the controller 11 allows a numerical character corresponding to the depressed numerical key to be displayed on the display device 2.

At Step N122, the controller 11 determines whether or not the post-verification flag is on. If the post-verification flag is on, the process proceeds to Step N123. The fact that the post-verification flag 13j is on signifies that the verification is performed immediately before the depression of an arbitrary key at Step N121. If the post-verification flag 13j is not on, the process is ended.

At Step N123, the controller 11 stores the value stored in the X register 13a in the accumulation calculation/verification register 13h.

At Step N124, the controller 11 allows the verification flag 13i to be on so as to indicate that a comparison value for verification is stored in the accumulation calculation/verification register 13h.

At Step S125, the controller 11 allows the post-verification flag 13j to be off so as to prevent the value displayed on the display device 2 from being stored in the accumulation calculation/verification register 13h by subsequent depression of a key.

In the case where the controller 11 stores the result of the calculation in the accumulation calculation/verification register 13h immediately after the verification, Steps N122 to N125 are omitted.

Figure 33:
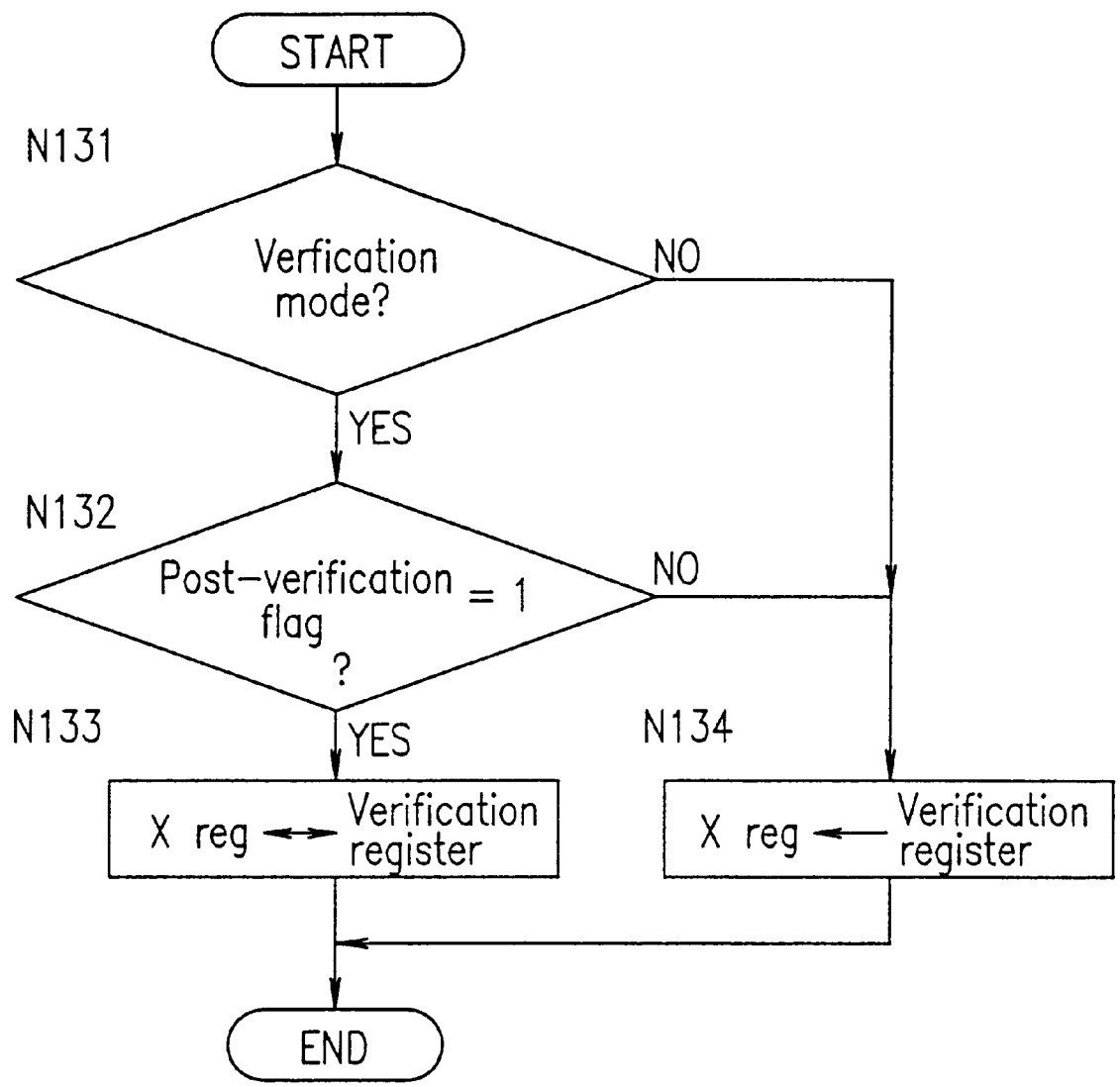
FIG. 33 is an exemplary flow chart of the electronic desk calculator according to the present invention.

FIG. 33 is a flow chart in the case where the key [PRE] is depressed.

At Step N131, the controller 11 determines whether or not the switch is at the position indicating the verification mode. If the switch is at the position indicating the verification mode, the process proceeds to Step N132. If not, the process proceeds to Step N134. In the case where the electronic desk calculator according to the present invention has a recall function for recalling the result of the previous calculation and the switch is not at the position indicating the verification mode, the process proceeds to Step N134.

At Step N132, the controller 11 determines whether or not the post-verification flag 13j is on. In the case where the post-verification flag 13j is on, the process proceeds to Step N133. If not, the process proceeds to Step N134. The fact that the post-verification flag 13j is on indicates that the verification has been executed just before by depressing the calculation result key.

At Step N133, the controller 11 allows the display device 2 to display the result of the calculation stored in the accumulation calculation/verification register 13h, and then exchanges the value stored in the accumulation calculation/verification register 13h and the value stored in the X register 13a.

At Step N134, in order to display a recall value of the accumulation calculation/verification register 13h or a value of the accumulation calculation on the display device 2, the controller 11 transmits the recall value of the accumulation calculation/verification register 13h or the value of the accumulation calculation in the X register 13a.

The controller 11 may perform a process for storing the value in the counter 13k for verification in the display counter 13c.

If the electronic desk calculator according to the present invention has a key [PRE/GT] serving both as the key [PRE] and the key [GT] instead of an individual key [PRE] and an individual key [GT], the process described above can be performed by depressing the key [PRE/GE].

Figure 34:
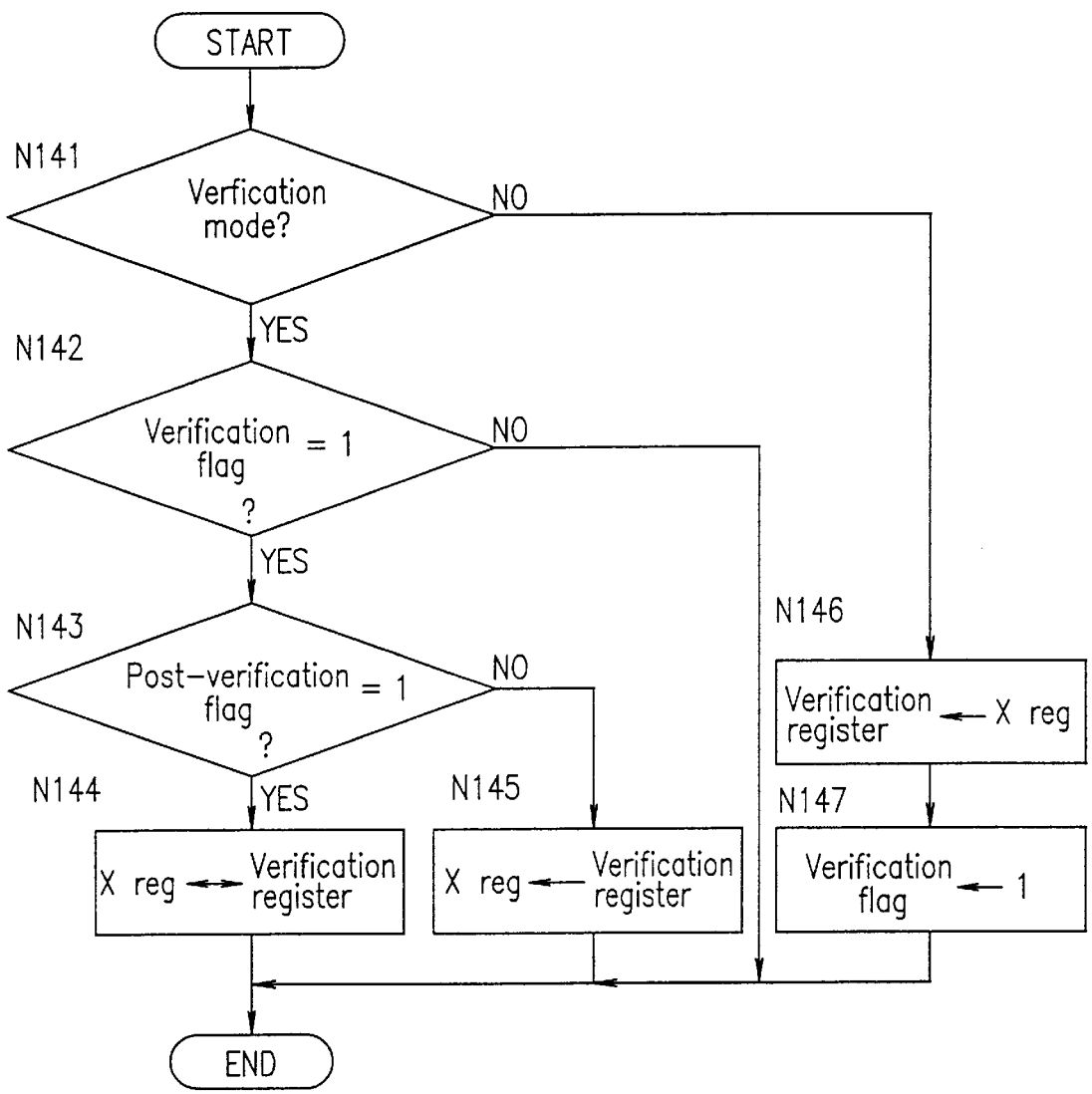
FIG. 34 is an exemplary flow chart of the electronic desk calculator according to the present invention.

FIG. 34 is a flow chart showing the process of the key [PRE].

At Step N141, the controller 11 determines whether or not the switch is at the position indicating the verification mode. In the case where the switch is at the position indicating the verification mode, the process proceeds to Step S142. If not, the process proceeds to step N146 so as to perform a process for storing the value displayed on the display device 2 as a verification value.

At Step N142, the controller 11 determines whether or not the verification flag 13i is on. If the verification flag 13i is on, the process proceeds to Step N143. If not, the process is ended. This is because the result of the previous calculation is not stored in the accumulation calculation/verification register 13h.

Since the process at Steps N143 to N145 is the same an that at Steps N132 to N134 shown in FIG. 33, the description thereof is basically herein omitted.

At Step N146, in order to store the value displayed on the display device 2 in the accumulation calculation/verification register 13h, the controller 11 transmits the value stored in the X register 13a in the accumulation calculation/verification register 13h. The electronic desk calculator of the present invention may include a key for only performing Steps N140 and N147.

At Step N147, the controller 11 allows the verification flag 13i to be on, indicating a comparison value used for verification is stored in the accumulation calculation/verification register 13h.

Since the electronic desk calculator according to the present invention includes the display counter 13c, in the event the user forgets the position of the calculation, a user can easily see the position of the calculation currently performed from a display count. In the case where a plurality of expressions are successively performed, the value stored in the display counter 13c is set at 1 by inputting a numerical unit. Therefore, a clear key for clearing the counter is not needed. Accordingly, the operativity is improved. In the electronic desk calculator of the present invention, the value stored in the display counter 13c is increased is regardless of the depression of an operation key or an execution key. Even if an operator which is not desired by a user is input, the display counter 13c is capable of holding a correct count number. Even when some key inputs are omitted using a calculation function for storing the number of operators, the display counter 13c is capable of holding a currant number including the omitted count number. The counter is capable of holding a correct operation number with respect to a specific operator key displaying several results of calculations in a cycle, regardless of the number of depressions of the key. Even when a calculation is performed including a memory calculation, the value obtained by a memory calculation and the number of the numeral units used for executing a memory calculation are stored. Therefore, even when a calculation other than the memory calculation is performed with an electronic desk calculator, the electronic desk calculator according to the present invention is capable of maintaining the value obtained by the calculation and the number of numeral units.

Since the electronic desk calculator according to the present invention compares a subject to be compared with the result of a calculation, an error is less likely to be generated as compared with the visual comparison performed by the user. Moreover, the time required to obtain the result of the comparison is reduced. The electronic desk calculator according to the present invention Uses only one register. Therefore, the electronic desk calculator of the present invention advantageously uses fewer components. The electronic device of the present invention has a verification function and a recall function. Therefore, the previous result can be actually verified if the result is different from the previously obtained one upon verification. As a result, the practicality of the verification function can be improved. Since it is not necessary to increase the numerical section, that is, only one numerical section is sufficient, the number of components can be small so as to realize a conventional verification function. Because the electronic desk calculator of the present invention has a reduced area for displaying a numerical value as compared with a conventional electronic desk calculator, the size of the electronic desk calculator can be reduced. Therefore, the practicality of the verification function can be improved. The electronic desk calculator of the present invention can be used for verification in the case where the result of a calculation is previously known.

Even if the user forgets a numerical unit to be input in an expression, the user can determine the numerical unit to be input based on the value displayed on the counter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic desk calculator comprising:

an input device for inputting a plurality of numeral units and an operator;

a counter storing a value representing the number of numeral units;

a controller performing a calculation based on at least one numeral unit and the operator, the controller receiving the at least one numeral unit input through the input device to increase a value stored in the counter by one; and a display displaying the value stored in the counter, wherein when the controller receives the at least one numeral unit input through the input device in a calculation completion state indicating that a calculation of the at least one numeral unit serving as a first operand and another at least one numeral unit serving as a second operand based on the operator is completed the controller clears the value stored in the counter and increases the value of the count stored in the counter by one.

2. An electronic desk calculator according to claim 1, wherein, when the electronic desk calculator receives the operator input through the input device in a calculation completion state indicating that a calculation of the at least one numeral unit serving as a first operand and another at least one numeral unit serving as a second operand based on the operator is completed, the value stored in the counter is maintained.

3. An electronic desk calculator according to claim 1, wherein, when the electronic desk calculator receives an operator input through the input device in a dual-input operation state, the value stored in the counter is maintained.

4. An electronic desk calculator according to claim 1, wherein the input device outputs a signal corresponding to a clear key, and the controller decreases the value stored in the counter by one in response to the signal.

5. An electronic desk calculator according to claim 1, wherein, in the case where the input operator is a single-input operator in a single-input operation state, the controller adds one to the value stored in the counter.

6. An electronic desk calculator according to claim 5, further comprising an input device for inputting a clear signal.

7. An electronic desk calculator according to claim 1, wherein the input device comprises:

a first memory receiving a storage instruction with a sign and storing a result of a calculation in accordance with the storage instruction with the sign; and a second memory storing the number of numeral units used in the calculation.

8. An electronic desk calculator comprising:

an input device for inputting a first numeral unit, an operator, a second numeral unit, and an instruction for obtaining a result of a calculation;

a display counter storing the value representing the number of the first and second numeral units;

an internal counter;

a first register storing the first numeral unit and the second numeral unit in the case where the one of the first numeral unit and the second numeral unit is input and for storing a result of a calculation when the instruction is input;

a second register storing the value stored in the first register in response to a signal corresponding to the input operator;

a controller calculating the value stored in the first register and the value stored in the second register based on the operator; and a display displaying the value stored in the display counter and the value stored in the first register, wherein, when a third numeral unit is input from the input device after the value stored in the display counter is stored in the internal counter in response to the instruction, the controller stores 1 in the display counter, wherein, when the instruction is input from the input device after the third numeral unit is input from the input device, the controller stores the value stored in the internal counter in the display counter, and wherein, when the controller receives the at least one numeral unit input through the input device in a calculation completion state indicating that a calculation of the at least one numeral unit serving as a first operand and another at least one numeral unit serving as a second operand based on the operator is completed the controller clears the value stored in the display counter and increases the value of the count stored in the display counter by one.

9. An electronic desk calculator comprising:

an input device for inputting a plurality of numeral units and an instruction for obtaining two or more results of calculations;

a display counter;

a controller calculating the two or more results of the calculations based on at least one of the numeral units and the instruction for obtaining the two or more results of the calculations; and a display displaying one of the two or more results of the calculations and a predetermined count number, wherein when the controller receives the at least one numeral unit input through the input device in a calculation completion state indicating that a calculation of the at least one numeral unit serving as a first operand and another at least one numeral unit serving as a second operand based on the operator is completed, the controller clears the value stored in the counter and increases the value of the count stored in the counter by one.

10. An electronic desk calculator comprising:

an input device for inputting a plurality of numeral units and an instruction for obtaining two or more results of calculations;

a display counter;

a controller calculating the two or more results of the calculations based on at least one of the numeral units and the instruction; and a display successively displaying one of the two or more results of the calculations, wherein, when the instruction is input from the input device, the display displays a value stored in the display counter and one of the two or more results of the calculations, and wherein, when the controller receives the at least one numeral unit input through the input device in a calculation completion state indicating that a calculation of the at least one numeral unit serving as a first operand and another at least one numeral unit serving as a second operand based on the operator is completed, the controller clears the value stored in the counter and increases the value of the count stored in the counter by one.

11. An electronic desk calculator comprising:

an input device for inputting a plurality of numeral units and an operator;

a comparator comparing a result of a calculation based on input numeral units and operators with a result of a previous calculation based on input numeral units and operators upon execution of the calculation;

a display device displaying the result of the comparison, an accumulation calculator performing an accumulation calculation in an accumulation calculation mode;

a selector performing a selection between a verification mode and the accumulation calculation mode to be compared by the comparator; and a recalling section displaying the result of the previous calculation after the comparator compares the result of the calculation with the result of the previous calculation.

12. An electronic desk calculator according to claim 11, comprising a selector for selecting one of the result of the calculation and the result of the previous calculation.

* * * * *